(12) United States Patent
Leeb et al.

(10) Patent No.: US 9,787,576 B2
(45) Date of Patent: *Oct. 10, 2017

(54) PROPAGATING ROUTING AWARENESS FOR AUTONOMOUS NETWORKS

(71) Applicant: Microsoft Technology Licensing, LLC, Redmond, WA (US)

(72) Inventors: Gunter Leeb, Redmond, WA (US); Amer A. Hassan, Kirkland, WA (US); Pascal F. Menezes, Bellevue, WA (US); Todd Haugen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

This patent is subject to a terminal disclaimer.

(21) Appl. No.: 14/460,985

(22) Filed: Aug. 15, 2014

(65) Prior Publication Data

US 2016/0036692 A1 Feb. 4, 2016

Related U.S. Application Data

(60) Provisional application No. 62/031,748, filed on Jul. 31, 2014.

(51) Int. Cl.
*G06F 15/173* (2006.01)
*H04L 12/709* (2013.01)
(Continued)

(52) U.S. Cl.
CPC .......... *H04L 45/245* (2013.01); *H04L 43/062* (2013.01); *H04L 45/04* (2013.01);
(Continued)

(58) Field of Classification Search
None
See application file for complete search history.

(56) References Cited

U.S. PATENT DOCUMENTS 3,410,774 A 11/1968 Barson et al.
3,542,453 A 11/1970 Kantor
(Continued)

FOREIGN PATENT DOCUMENTS

CN 1904823 1/2007
CN 101036104 9/2007
(Continued)

OTHER PUBLICATIONS

"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
(Continued)

*Primary Examiner* — Lance Leonard Barry
*Assistant Examiner* — Mohammad Yousuf A Mian

(57) ABSTRACT

Techniques for propagating routing awareness for autonomous networks are described. In at least some embodiments, routing awareness refers to attributes of autonomous networks that route communication sessions between different endpoints. According to various embodiments, routing awareness indicates whether a particular autonomous network supports a protocol for propagating routing awareness among different autonomous networks. Routing awareness may also include performance attributes of autonomous networks. Such routing awareness enables entities involved in routing communication sessions to make informed decisions regarding routing and handling of communication sessions.

20 Claims, 8 Drawing Sheets

(51) Int. Cl.
*H04L 12/26* (2006.01)
*H04L 12/715* (2013.01)
*H04L 12/717* (2013.01)
*H04L 12/801* (2013.01)

(52) U.S. Cl.
CPC .............. *H04L 45/42* (2013.01); *H04L 45/64* (2013.01); *H04L 47/19* (2013.01)

(56) References Cited

U.S. PATENT DOCUMENTS

| | | | |
|---|---|---|---|
| 4,294,507 A | 10/1981 | Johnson |
| 4,758,087 A | 7/1988 | Hicks, Jr. |
| 4,799,752 A | 1/1989 | Carome |
| 5,004,673 A | 4/1991 | Vlannes |
| 5,019,898 A | 5/1991 | Chao et al. |
| 5,106,181 A | 4/1992 | Rockwell, III |
| 5,305,389 A | 4/1994 | Palmer |
| 5,313,535 A | 5/1994 | Williams |
| 5,549,212 A | 8/1996 | Kanoh et al. |
| 5,648,643 A | 7/1997 | Knowles et al. |
| 5,712,995 A | 1/1998 | Cohn |
| 5,771,042 A | 6/1998 | Santos-Gomez |
| 5,772,903 A | 6/1998 | Hirsch |
| 5,880,725 A | 3/1999 | Southgate |
| 5,920,315 A | 7/1999 | Santos-Gomez |
| 5,991,087 A | 11/1999 | Rallison |
| 6,144,439 A | 11/2000 | Carollo |
| 6,169,829 B1 | 1/2001 | Laming et al. |
| 6,181,852 B1 | 1/2001 | Adams et al. |
| 6,264,787 B1 | 7/2001 | Burbank |
| 6,323,949 B1 | 11/2001 | Lading et al. |
| 6,385,641 B1 | 5/2002 | Jiang |
| 6,417,892 B1 | 7/2002 | Sharp et al. |
| 6,483,580 B1 | 11/2002 | Xu et al. |
| 6,553,165 B1 | 4/2003 | Temkin et al. |
| 6,661,436 B2 | 12/2003 | Barksdale et al. |
| 6,664,983 B2 | 12/2003 | Ludolph |
| 6,792,328 B2 | 9/2004 | Laughery et al. |
| 6,877,134 B1 | 4/2005 | Fuller et al. |
| 6,880,132 B2 | 4/2005 | Uemura |
| 6,901,403 B1 | 5/2005 | Bata et al. |
| 6,916,584 B2 | 7/2005 | Sreenivasan et al. |
| 6,957,071 B1 | 10/2005 | Holur et al. |
| 7,020,848 B2 | 3/2006 | Rosenzweig et al. |
| 7,028,253 B1 | 4/2006 | Lieberman et al. |
| 7,031,894 B2 | 4/2006 | Niu et al. |
| 7,099,005 B1 | 8/2006 | Fabrikant et al. |
| 7,151,635 B2 | 12/2006 | Bidnyk et al. |
| 7,159,174 B2 | 1/2007 | Johnson et al. |
| 7,181,699 B2 | 2/2007 | Morrow et al. |
| 7,189,362 B2 | 3/2007 | Nordin et al. |
| 7,196,758 B2 | 3/2007 | Crawford et al. |
| 7,212,709 B2 | 5/2007 | Hosoi |
| 7,212,723 B2 | 5/2007 | McLeod et al. |
| 7,227,880 B2 | 6/2007 | Blauvelt et al. |
| 7,261,827 B2 | 8/2007 | Ootsu et al. |
| 7,333,690 B1 | 2/2008 | Peale et al. |
| 7,372,565 B1 | 5/2008 | Holden et al. |
| 7,437,678 B2 | 10/2008 | Awada et al. |
| 7,496,642 B2 | 2/2009 | Gill et al. |
| 7,513,627 B2 | 4/2009 | Larson et al. |
| 7,532,227 B2 | 5/2009 | Nakajima et al. |
| 7,587,419 B2 | 9/2009 | Thorpe et al. |
| 7,612,882 B2 | 11/2009 | Wu et al. |
| 7,634,478 B2 | 12/2009 | Yang et al. |
| 7,668,842 B2 | 2/2010 | LaChapelle et al. |
| 7,693,911 B2 | 4/2010 | Wories et al. |
| 7,706,785 B2 | 4/2010 | Lei et al. |
| 7,716,003 B1 | 5/2010 | Wack et al. |
| 7,716,317 B2 | 5/2010 | Kumar et al. |
| 7,719,769 B2 | 5/2010 | Sugihara et al. |
| 7,728,933 B2 | 6/2010 | Kim et al. |
| 7,730,113 B1 | 6/2010 | Payette et al. |
| 7,788,474 B2 | 8/2010 | Switzer et al. |
| 7,818,336 B1 | 10/2010 | Amidon et al. |
| 7,826,508 B2 | 11/2010 | Reid et al. |
| 7,871,811 B2 | 1/2011 | Fang et al. |
| 7,882,115 B2 | 2/2011 | Hirsch |
| 7,890,882 B1 | 2/2011 | Nelson |
| 7,904,832 B2 | 3/2011 | Ubillos |
| 7,908,273 B2 | 3/2011 | DiMaria et al. |
| 7,966,184 B2 | 6/2011 | O'Conor et al. |
| 7,987,490 B2 | 7/2011 | Ansari et al. |
| 8,014,644 B2 | 9/2011 | Morimoto et al. |
| 8,108,430 B2 | 1/2012 | Wong et al. |
| 8,128,800 B2 | 3/2012 | Seo et al. |
| 8,131,118 B1 | 3/2012 | Jing et al. |
| 8,139,504 B2 | 3/2012 | Mankins et al. |
| 8,150,893 B2 | 4/2012 | Bohannon et al. |
| 8,162,524 B2 | 4/2012 | Van Ostrand et al. |
| 8,165,988 B2 | 4/2012 | Shau et al. |
| 8,176,436 B2 | 5/2012 | Arend et al. |
| 8,200,704 B2 | 6/2012 | Petakov et al. |
| 8,244,667 B1 | 8/2012 | Weinberger et al. |
| 8,246,170 B2 | 8/2012 | Yamamoto et al. |
| 8,280,861 B1 | 10/2012 | Park et al. |
| 8,285,810 B2 | 10/2012 | Svendsen et al. |
| 8,291,349 B1 | 10/2012 | Park et al. |
| 8,296,380 B1 | 10/2012 | Kelly et al. |
| 8,300,614 B2 | 10/2012 | Ankaiah et al. |
| 8,332,402 B2 | 12/2012 | Forstall et al. |
| 8,341,037 B2 | 12/2012 | Bachman et al. |
| 8,358,400 B2 | 1/2013 | Escuti |
| 8,402,071 B2 | 3/2013 | Skillcorn |
| 8,434,019 B2 | 4/2013 | Nelson |
| 8,472,119 B1 | 6/2013 | Kelly |
| 8,526,993 B2 | 9/2013 | Bria et al. |
| 8,538,351 B2 | 9/2013 | Wilson et al. |
| 8,571,539 B1 | 10/2013 | Ranganathan et al. |
| 8,576,143 B1 | 11/2013 | Kelly |
| 8,589,341 B2 | 11/2013 | Golde et al. |
| 8,594,702 B2 | 11/2013 | Naaman et al. |
| 8,605,700 B2 | 12/2013 | Gurin |
| 8,612,888 B2 | 12/2013 | Pennington et al. |
| 8,627,228 B2 | 1/2014 | Yosef et al. |
| 8,629,815 B2 | 1/2014 | Brin et al. |
| 8,693,500 B2 | 4/2014 | Ludwig et al. |
| 8,698,845 B2 | 4/2014 | Lemay |
| 8,700,931 B2 | 4/2014 | Gudlavenkatasiva et al. |
| 8,745,513 B2 | 6/2014 | Crystal |
| 8,756,510 B2 | 6/2014 | Bhumkar et al. |
| 8,769,431 B1 | 7/2014 | Prasad |
| 8,793,282 B2 | 7/2014 | Hedinsson et al. |
| 8,819,079 B2 | 8/2014 | Bush et al. |
| 8,843,744 B2 | 9/2014 | Sentinelli et al. |
| 8,990,255 B2 | 3/2015 | Metsatahti et al. |
| 9,003,162 B2 | 4/2015 | Lomet et al. |
| 9,269,150 B1 | 2/2016 | Seitz |
| 9,304,235 B2 | 4/2016 | Sainiemi et al. |
| 9,414,417 B2 | 8/2016 | Hassan et al. |
| 9,514,211 B2 | 12/2016 | Sengupta et al. |
| 2002/0035455 A1 | 3/2002 | Niu et al. |
| 2002/0038196 A1 | 3/2002 | Johnson et al. |
| 2002/0138772 A1 | 9/2002 | Crawford et al. |
| 2002/0171939 A1 | 11/2002 | Song |
| 2002/0191028 A1 | 12/2002 | Senechalle et al. |
| 2003/0021404 A1 | 1/2003 | Wengrovitz |
| 2003/0137706 A1 | 7/2003 | Rmanujam et al. |
| 2003/0179453 A1 | 9/2003 | Mori et al. |
| 2003/0204698 A1 | 10/2003 | Sachedina et al. |
| 2004/0024580 A1 | 2/2004 | Salmonsen et al. |
| 2004/0042724 A1 | 3/2004 | Gombert et al. |
| 2004/0139169 A1 | 7/2004 | O'Brien et al. |
| 2004/0141637 A1 | 7/2004 | Bacus et al. |
| 2004/0151466 A1 | 8/2004 | Crossman-Bosworth et al. |
| 2004/0162830 A1 | 8/2004 | Shirwadkar et al. |
| 2005/0022135 A1 | 1/2005 | de Waal |
| 2005/0100272 A1 | 5/2005 | Gilman |
| 2005/0128951 A1 | 6/2005 | Chawla et al. |
| 2005/0246352 A1 | 11/2005 | Moore et al. |
| 2006/0020903 A1 | 1/2006 | Wang et al. |
| 2006/0053417 A1 | 3/2006 | Henderson et al. |
| 2006/0061597 A1 | 3/2006 | Hui |

(56) References Cited

U.S. PATENT DOCUMENTS

| | | |
|---|---|---|
| 2006/0080401 A1 | 4/2006 | Gill et al. |
| 2006/0132806 A1 | 6/2006 | Shchegrov et al. |
| 2006/0132914 A1 | 6/2006 | Weiss et al. |
| 2006/0155723 A1 | 7/2006 | Kumar et al. |
| 2006/0183331 A1 | 8/2006 | Hofmann |
| 2006/0221448 A1 | 10/2006 | Nivon et al. |
| 2006/0228073 A1 | 10/2006 | Mukawa et al. |
| 2006/0235548 A1 | 10/2006 | Gaudette |
| 2006/0256738 A1* | 11/2006 | Kenoyer ............ H04L 43/0811 370/260 |
| 2006/0262772 A1* | 11/2006 | Guichard ........... H04L 43/0811 370/351 |
| 2006/0271691 A1 | 11/2006 | Jacobs et al. |
| 2007/0005334 A1 | 1/2007 | Salmonsen |
| 2007/0023703 A1 | 2/2007 | Sunaoshi et al. |
| 2007/0033225 A1 | 2/2007 | Davis |
| 2007/0208687 A1 | 9/2007 | O'Conor et al. |
| 2007/0214180 A1 | 9/2007 | Crawford |
| 2007/0214228 A1 | 9/2007 | Horvitz et al. |
| 2007/0233803 A1 | 10/2007 | Stienhans |
| 2007/0250788 A1 | 10/2007 | Rigolet |
| 2007/0253545 A1 | 11/2007 | Chatterjee et al. |
| 2007/0288478 A1 | 12/2007 | DiMaria et al. |
| 2008/0005348 A1 | 1/2008 | Kosiba et al. |
| 2008/0014534 A1 | 1/2008 | Barwicz et al. |
| 2008/0025350 A1 | 1/2008 | Arbore et al. |
| 2008/0040578 A1 | 2/2008 | Kang et al. |
| 2008/0049704 A1 | 2/2008 | Witteman et al. |
| 2008/0059535 A1 | 3/2008 | Lindsley et al. |
| 2008/0092054 A1 | 4/2008 | Bhumkar et al. |
| 2008/0120571 A1 | 5/2008 | Chang et al. |
| 2008/0126989 A1 | 5/2008 | Flores et al. |
| 2008/0158189 A1 | 7/2008 | Kim |
| 2008/0189303 A1 | 8/2008 | Bush et al. |
| 2009/0049194 A1* | 2/2009 | Csaszar ............ H04L 12/5695 709/242 |
| 2009/0084757 A1 | 4/2009 | Erokhin et al. |
| 2009/0113301 A1 | 4/2009 | Fisher et al. |
| 2009/0144642 A1 | 6/2009 | Crystal |
| 2009/0193024 A1 | 7/2009 | Dhananjaya |
| 2009/0196510 A1 | 8/2009 | Gokturk et al. |
| 2009/0198581 A1 | 8/2009 | Lidestri |
| 2009/0199128 A1 | 8/2009 | Matthews et al. |
| 2009/0224416 A1 | 9/2009 | Laakkonen et al. |
| 2009/0235203 A1 | 9/2009 | Iizuka |
| 2009/0246707 A1 | 10/2009 | Li et al. |
| 2009/0265416 A1 | 10/2009 | Svendsen et al. |
| 2010/0005168 A1 | 1/2010 | Williams et al. |
| 2010/0005397 A1 | 1/2010 | Lanahan et al. |
| 2010/0018858 A1 | 1/2010 | Seki |
| 2010/0021108 A1 | 1/2010 | Kang et al. |
| 2010/0023691 A1 | 1/2010 | Shin |
| 2010/0042648 A1 | 2/2010 | Cannon et al. |
| 2010/0074291 A1 | 3/2010 | Nakamura |
| 2010/0079865 A1 | 4/2010 | Saarikko et al. |
| 2010/0094934 A1 | 4/2010 | Svendsen et al. |
| 2010/0138809 A1 | 6/2010 | Shenfield et al. |
| 2010/0146130 A1 | 6/2010 | Montemurro et al. |
| 2010/0159995 A1 | 6/2010 | Stallings et al. |
| 2010/0191783 A1 | 7/2010 | Mason |
| 2010/0191827 A1 | 7/2010 | Martin |
| 2010/0201953 A1 | 8/2010 | Freeman et al. |
| 2010/0205178 A1 | 8/2010 | Bush et al. |
| 2010/0211575 A1 | 8/2010 | Collins et al. |
| 2010/0262582 A1 | 10/2010 | Garcia-Ascanio |
| 2010/0281382 A1 | 11/2010 | Meaney et al. |
| 2010/0299417 A1 | 11/2010 | Austin et al. |
| 2010/0299697 A1 | 11/2010 | Austin et al. |
| 2010/0332456 A1 | 12/2010 | Prahlad et al. |
| 2011/0038049 A1 | 2/2011 | Vallius et al. |
| 2011/0055765 A1 | 3/2011 | Neubrand et al. |
| 2011/0072299 A1 | 3/2011 | Callaghan et al. |
| 2011/0087531 A1 | 4/2011 | Winters et al. |
| 2011/0087674 A1 | 4/2011 | Schokking et al. |
| 2011/0099199 A1 | 4/2011 | Stalenhoef et al. |
| 2011/0099512 A1 | 4/2011 | Jeong |
| 2011/0106798 A1 | 5/2011 | Li et al. |
| 2011/0119597 A1 | 5/2011 | Yellamraju et al. |
| 2011/0134017 A1 | 6/2011 | Burke |
| 2011/0154198 A1 | 6/2011 | Bachman et al. |
| 2011/0161174 A1 | 6/2011 | Simms et al. |
| 2011/0161409 A1 | 6/2011 | Nair et al. |
| 2011/0175930 A1 | 7/2011 | Hwang et al. |
| 2011/0231192 A1 | 9/2011 | O'Conor et al. |
| 2011/0231745 A1 | 9/2011 | Levesque et al. |
| 2011/0235179 A1 | 9/2011 | Simmonds |
| 2011/0283185 A1 | 11/2011 | Obasanjo et al. |
| 2011/0295913 A1 | 12/2011 | Enbutsu |
| 2012/0003958 A1* | 1/2012 | Hossain ................ H04L 63/101 455/411 |
| 2012/0005602 A1 | 1/2012 | Anttila et al. |
| 2012/0030213 A1 | 2/2012 | Arrouye et al. |
| 2012/0030616 A1 | 2/2012 | Howes et al. |
| 2012/0033306 A1 | 2/2012 | Valera et al. |
| 2012/0041721 A1 | 2/2012 | Chen |
| 2012/0054674 A1 | 3/2012 | Beykpour et al. |
| 2012/0062998 A1 | 3/2012 | Schultz et al. |
| 2012/0069413 A1 | 3/2012 | Schultz |
| 2012/0084710 A1 | 4/2012 | Sirpal et al. |
| 2012/0113964 A1 | 5/2012 | Petersen et al. |
| 2012/0120493 A1 | 5/2012 | Simmonds et al. |
| 2012/0130927 A1 | 5/2012 | Shimogori |
| 2012/0134623 A1 | 5/2012 | Boudreau et al. |
| 2012/0144331 A1 | 6/2012 | Tolonen et al. |
| 2012/0166980 A1 | 6/2012 | Yosef et al. |
| 2012/0166997 A1 | 6/2012 | Cho et al. |
| 2012/0176322 A1 | 7/2012 | Karmi et al. |
| 2012/0176474 A1 | 7/2012 | Border |
| 2012/0195553 A1 | 8/2012 | Hasegawa et al. |
| 2012/0204191 A1 | 8/2012 | Shia et al. |
| 2012/0208168 A1 | 8/2012 | Atkinson et al. |
| 2012/0209573 A1 | 8/2012 | Karrat |
| 2012/0209922 A1 | 8/2012 | Bhatia et al. |
| 2012/0235885 A1 | 9/2012 | Miller et al. |
| 2012/0242561 A1 | 9/2012 | Sugihara |
| 2012/0246596 A1 | 9/2012 | Ording et al. |
| 2012/0262657 A1 | 10/2012 | Nakanishi et al. |
| 2012/0271823 A1 | 10/2012 | Asikainen et al. |
| 2012/0290654 A1 | 11/2012 | Detwiller et al. |
| 2012/0292535 A1 | 11/2012 | Choi et al. |
| 2012/0304092 A1 | 11/2012 | Jarrett et al. |
| 2012/0304116 A1 | 11/2012 | Donahue et al. |
| 2012/0311481 A1 | 12/2012 | Reyna et al. |
| 2012/0331141 A1 | 12/2012 | Carter et al. |
| 2013/0019273 A1 | 1/2013 | Ma et al. |
| 2013/0024424 A1 | 1/2013 | Prahlad et al. |
| 2013/0024805 A1 | 1/2013 | In et al. |
| 2013/0027613 A1 | 1/2013 | Kim et al. |
| 2013/0042275 A1 | 2/2013 | Payette et al. |
| 2013/0047118 A1 | 2/2013 | Hooper et al. |
| 2013/0090988 A1 | 4/2013 | Moore et al. |
| 2013/0091204 A1 | 4/2013 | Loh et al. |
| 2013/0097685 A1 | 4/2013 | Kennedy et al. |
| 2013/0106592 A1 | 5/2013 | Morgan et al. |
| 2013/0148864 A1 | 6/2013 | Dolson et al. |
| 2013/0170802 A1 | 7/2013 | Pitwon |
| 2013/0187866 A1 | 7/2013 | Kim et al. |
| 2013/0198176 A1 | 8/2013 | Kim |
| 2013/0226931 A1 | 8/2013 | Hazel et al. |
| 2013/0254412 A1 | 9/2013 | Menezes et al. |
| 2013/0254708 A1 | 9/2013 | Dorcey |
| 2013/0300684 A1 | 11/2013 | Kim et al. |
| 2013/0305184 A1 | 11/2013 | Kim et al. |
| 2013/0339446 A1 | 12/2013 | Balassanian et al. |
| 2013/0343291 A1 | 12/2013 | Gao et al. |
| 2013/0346408 A1 | 12/2013 | Duarte et al. |
| 2013/0346725 A1 | 12/2013 | Lomet et al. |
| 2014/0022265 A1 | 1/2014 | Canan |
| 2014/0053097 A1 | 2/2014 | Shin et al. |
| 2014/0059139 A1 | 2/2014 | Filev et al. |
| 2014/0063367 A1 | 3/2014 | Yang et al. |
| 2014/0086081 A1 | 3/2014 | Mack et al. |
| 2014/0089833 A1 | 3/2014 | Hwang et al. |
| 2014/0092765 A1 | 4/2014 | Agarwal et al. |

(56) References Cited

U.S. PATENT DOCUMENTS

| | | |
|---|---|---|
| 2014/0098671 A1 | 4/2014 | Raleigh et al. |
| 2014/0104665 A1 | 4/2014 | Popovich et al. |
| 2014/0111865 A1 | 4/2014 | Kobayashi |
| 2014/0116982 A1 | 5/2014 | Schellenberg et al. |
| 2014/0133456 A1 | 5/2014 | Donepudi et al. |
| 2014/0143247 A1 | 5/2014 | Rathnavelu et al. |
| 2014/0143351 A1 | 5/2014 | Deng |
| 2014/0143439 A1 | 5/2014 | Ramamurthy |
| 2014/0143708 A1 | 5/2014 | Yang et al. |
| 2014/0148170 A1 | 5/2014 | Damji et al. |
| 2014/0153390 A1 | 6/2014 | Ishii et al. |
| 2014/0155123 A1 | 6/2014 | Lee et al. |
| 2014/0164957 A1 | 6/2014 | Shin et al. |
| 2014/0164990 A1 | 6/2014 | Kim et al. |
| 2014/0189557 A1 | 7/2014 | O'Connell et al. |
| 2014/0195620 A1 | 7/2014 | Srinivasan et al. |
| 2014/0195976 A1 | 7/2014 | Ow et al. |
| 2014/0240842 A1 | 8/2014 | Nguyen et al. |
| 2014/0310646 A1 | 10/2014 | Vranjes et al. |
| 2014/0314374 A1 | 10/2014 | Fattal et al. |
| 2014/0351722 A1 | 11/2014 | Frederickson et al. |
| 2015/0002614 A1 | 1/2015 | Zino et al. |
| 2015/0046500 A1 | 2/2015 | Bush et al. |
| 2015/0199075 A1 | 7/2015 | Kuscher et al. |
| 2015/0212660 A1 | 7/2015 | Su |
| 2015/0243236 A1 | 8/2015 | Jain et al. |
| 2015/0317026 A1 | 11/2015 | Choi et al. |
| 2015/0317062 A1 | 11/2015 | Jarrett et al. |
| 2015/0325211 A1 | 11/2015 | Lee et al. |
| 2015/0356121 A1 | 12/2015 | Schmelzer |
| 2016/0019279 A1 | 1/2016 | Sengupta et al. |
| 2016/0033784 A1 | 2/2016 | Levola et al. |
| 2016/0034155 A1 | 2/2016 | Vranjes et al. |
| 2016/0034156 A1 | 2/2016 | Vranjes et al. |
| 2016/0034157 A1 | 2/2016 | Vranjes et al. |
| 2016/0034159 A1 | 2/2016 | Vranjes et al. |
| 2016/0034284 A1 | 2/2016 | Won et al. |
| 2016/0034459 A1 | 2/2016 | Larsen et al. |
| 2016/0044716 A1 | 2/2016 | Hassan et al. |
| 2016/0110403 A1 | 4/2016 | Lomet et al. |
| 2016/0316023 A1 | 10/2016 | Hassan et al. |

FOREIGN PATENT DOCUMENTS

| | | |
|---|---|---|
| CN | 101105512 | 1/2008 |
| CN | 103543904 | 1/2014 |
| EP | 0977022 | 2/2000 |
| EP | 1847924 | 10/2007 |
| EP | 2083310 | 7/2009 |
| EP | 2144177 | 1/2010 |
| EP | 2662761 | 11/2013 |
| EP | 2752691 | 7/2014 |
| FR | 2942811 | 9/2010 |
| JP | 2000347037 | 12/2000 |
| KR | 20070001771 | 1/2007 |
| KR | 20090084316 | 8/2009 |
| TW | 201407202 | 2/2014 |
| WO | WO-0051299 | 8/2000 |
| WO | WO-0133282 | 5/2001 |
| WO | WO-2006054056 | 5/2006 |
| WO | WO-2007057500 | 5/2007 |
| WO | WO-2010049002 | 5/2010 |
| WO | WO-2011131978 | 10/2011 |
| WO | WO-2012177811 | 12/2012 |
| WO | WO-2013117211 | 8/2013 |
| WO | WO-2014051920 | 4/2014 |
| WO | WO-2014071308 | 5/2014 |
| WO | WO-2014085502 | 6/2014 |
| WO | WO-2014088343 | 6/2014 |
| WO | WO-2014130383 | 8/2014 |
| WO | WO-2016014368 | 1/2016 |
| WO | WO-2016064575 | 4/2016 |

OTHER PUBLICATIONS

"Always Connected", Available at: http://www.samsung.com/global/microsite/galaxycamera/nx/, Jun. 24, 2013, 5 pages.

"Controlling Your Desktop's Power Management", Retrieved From: <http://www.vorkon.de/SU1210.001/drittanbieter/Dokumentation/openSUSE_11.2/manual/sec.gnomeuser.start.power_mgmt.html> Jul. 7, 2014, 6 Pages.

"Display Control", Retrieved From: <http://www.portrait.com/technology/display-control.html> Jul. 4, 2014, Jun. 24, 2013, 5 Pages.

"Extended European Search Report", EP Application No. 11866699.9, Jan. 15, 2015, 6 pages.

"Extended European Search Report", EP Application No. 11866772.4, Jan. 15, 2015, 6 pages.

"Final Office Action", U.S. Appl. No. 13/774,875, Jun. 4, 2015, 10 pages.

"Final Office Action", U.S. Appl. No. 13/863,369, Jul. 21, 2015, 17 pages.

"First Examination Report", NZ Application No. 618284, May 20, 2014, 2 pages.

"Foreign Office Action", CL Application No. 3370-2013, May 7, 2015, 6 pages.

"Foreign Office Action", CL Application No. 3370-2013, Oct. 29, 2015, 6 pages.

"Foreign Office Action", CN Application No. 201180071196.8, Sep. 11, 2014, 13 pages.

"Foreign Office Action", CO Application No. 13300265, Apr. 21, 2015, 11 Pages.

"Foreign Office Action", CO Application No. 13300265, Sep. 24, 2014, 10 Pages.

"Foreign Office Action", JP Application No. 2014-512824, Nov. 6, 2015, 5 pages.

"Foreign Office Action", PH Application No. PH/1/2013/502367, Apr. 24, 2015, 3 pages.

"Foreign Office Action", RU Application No. 2013152630, Oct. 26, 2015, 5 pages.

"Further Examination Report", NZ Application No. 618284, Jul. 13, 2015, 2 pages.

"International Search Report and Written Opinion", Application No. PCT/US2014/016658, Apr. 23, 2014, 10 pages.

"International Search Report and Written Opinion", Application No. PCT/US2015/042371, Oct. 2, 2015, 10 pages.

"International Search Report and Written Opinion", Application No. PCT/US2015/042226, Oct. 27, 2015, 10 Pages.

"International Search Report and Written Opinion", Application No. PCT/US2015/042205, Oct. 30, 2015, 10 pages.

"International Search Report and Written Opinion", Application No. PCT/US2015/042218, Nov. 6, 2015, 10 pages.

"International Search Report and Written Opinion", Application No. PCT/US2013/060247, Dec. 10, 2013, 10 pages.

"International Search Report and Written Opinion", Application No. PCT/USUS15/042259, Oct. 12, 2015, 11 Pages.

"International Search Report and Written Opinion", Application No. PCT/US2015/041930, Oct. 20, 2015, 12 Pages.

"International Search Report and Written Opinion", Application No. PCT/US2015/041900, Oct. 21, 2015, 12 pages.

"International Search Report and Written Opinion", Application No. PCT/US2015/041909, Oct. 20, 2015, 13 pages.

"Manage Multiple Windows", Retrieved From: <http://windows.microsoft.com/en-hk/windows/manage-multiple-windows#1TC=windows-7> Jul. 8, 2014, 4 Pages.

"Merge Operator", Retrieved on: Jun. 3, 2014, Available at: https://github.com/facebook/rocksdb/wiki/Merge-Operator, 10 pages.

"New Technology from MIT may Enable Cheap, Color, Holographic Video Displays", Retrieved from <http://www.gizmag.com/holograph-3d-color-video-display-inexpensive-mit/28029/> on Feb. 25, 2015, Jun. 24, 2013, 8 pages.

"Non-Final Office Action", U.S. Appl. No. 13/118,347, Dec. 3, 2014, 28 pages.

"Non-Final Office Action", U.S. Appl. No. 13/657,646, Aug. 12, 2014, 14 pages.

"Non-Final Office Action", U.S. Appl. No. 13/774,875, Sep. 16, 2015, 8 pages.

(56) References Cited

OTHER PUBLICATIONS

"Non-Final Office Action", U.S. Appl. No. 13/774,875, Nov. 24, 2014, 8 pages.
"Non-Final Office Action", U.S. Appl. No. 13/863,369, Dec. 21, 2015, 17 pages.
"Non-Final Office Action", U.S. Appl. No. 13/863,369, Feb. 27, 2015, 16 pages.
"Notice of Allowance", U.S. Appl. No. 13/118,347, Apr. 1, 2015, 7 pages.
"Notice of Allowance", U.S. Appl. No. 13/657,646, Feb. 6, 2015, 15 pages.
"Notice of Allowance", U.S. Appl. No. 14/447,464, Nov. 9, 2015, 10 pages.
"Organize Your Desktop Workspace for More Comfort with WindowSpace", Retrieved From: <http://www.ntwind.com/software/windowspace.html> Jul. 4, 2014, Sep. 19, 2008, 5 Pages.
"Restriction Requirement", U.S. Appl. No. 14/447,419, Aug. 4, 2015, 6 pages.
"Restriction Requirement", U.S. Appl. No. 14/454,545, Oct. 2, 2015, 6 pages.
"SizeUp The Missing Window Manager", Retrieved From: <https://www.irradiatedsoftware.com/sizeup/> Jul. 4, 2014, Jan. 17, 2013, 4 Pages.
"Split the Windows® Desktop: How to Divide a Single Large Desktop into Multiple Smaller Ones", retrieved from <http://www.actualtools.com/multiplemonitors/split-windows-desktop-how-to-divide-single-large-desktop-into-smaller-ones.shtml> on Jul. 7, 2014, Apr. 10, 2014, 3 pages.
"Using Flickr to Organize a Collection of Images", Available at: http://www.jiscdigitalmedia.ac.uk/guide/using-flickr-to-organise-a-collection-of-images, Apr. 2, 2013, 17 pages.
"Window Magnet", Retrieved From: <http://magnet.crowdcafe.com/> Jul. 4, 2014, Jun. 23, 2011, 2 Pages.
"Windows 7: Display Reminder When Click on Shutdown?", Retrieved From: <http://www.sevenforums.com/customization/118688-display-reminder-when-click-shutdown.html> Jul. 8, 2014, Oct. 18, 2010, 5 Pages.
"Working with Windows", Retrieved From: <http://windows.microsoft.com/en-us/windows/working-with-windows#1TC=windows-7> Jul. 4, 2014, 10 Pages.
Ando,"Development of Three-Dimensional Microstages Using Inclined Deep-Reactive Ion Etching", Journal of Microelectromechanical Systems, Jun. 1, 2007, 10 pages.
Ashraf,"Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.
Callaghan,"Types of writes", Available at: http://smalldatum.blogspot.in/2014/04/types-of-writes.html, Apr. 17, 2014, 3 pages.
Chang-Yen,"A Monolithic PDMS Waveguide System Fabricated Using Soft-Lithography Techniques", In Journal of Lightwave Technology, vol. 23, No. 6, Jun. 2005, 6 pages.
Charles,"Design of Optically Path Length Matched, Three-Dimensional Photonic Circuits Comprising Uniquely Routed Waveguides", In Proceedings of Applied Optics, vol. 51, Issue 27, Sep. 20, 2012, 11 pages.
Chen,"A Study of Fiber-to-Fiber Losses in Waveguide Grating Routers", In Journal of Lightwave Technology, vol. 15, No. 10, Oct. 1997, 5 pages.
Cohen,"Automatic Strategies in the Siemens RTL Tiled Window Manager", In Proceedings: The 2nd IEEE Conference on Computer Workstations, Mar. 7, 1988, pp. 111-119.
Cottier,"Label-free Highly Sensitive Detection of (small) Molecules by Wavelength Interrogation of Integrated Optical Chips", n Proceedings of Sensors and Actuators B: Chemical, vol. 91, Issue 1-3, Jun. 1, 2003, pp. 241-251.
Dumon,"Compact Arrayed Waveguide Grating Devices in Silicon-on-Insulator", In Proceedings of the IEEE/LEOS Symposium Benelux Chapter, May 27, 2014, 4 pages.

Eckel,"Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.
Garcia,"COMET: Content Mediator Architecture for Content-Aware Networks", In IEEE Future Network & Mobile Summit, 2011, 8 pages.
Gila,"First Results From a Multi-Ion Beam Lithography and Processing System at The University of Florida", AIP Conference Proceedings, Jun. 1, 2011, 6 pages.
Glendenning,"Polymer Micro-Optics via Micro Injection Moulding", Available at: https://web.archive.org/web/20120310003606/http://www.microsystems.uk.com/english/polymer_optics_injection_moulding.html, Jan. 10, 2011, 6 pages.
Greiner,"Bandpass engineering of lithographically scribed channel-waveguide Bragg gratings", In Proceedings of Optics Letters, vol. 29, No. 8, Apr. 15, 2004, pp. 806-808.
Hepburn,"Color: The Location Based Social Photo App", Available at: http://www.digitalbuzzblog.com/color-the-location-based-social-photo-iphone-app/, Mar. 27, 2011, 12 pages.
Hollister,"Windows 8 Primer: How to Navigate Microsoft's New Operating System", retrieved from <http://www.theverge.com/2012/10/28/3562172/windows-8-gestures-keyboard-shortcuts-tips-tricks-how-to-guide> on Aug. 7, 2014, Oct. 28, 2012, 30 pages.
Hua,"Engineering of Head-mounted Projective Displays", In Proceedings of Applied Optics, vol. 39, No. 22, Aug. 1, 2000, 11 pages.
Ismail,"Improved Arrayed-Waveguide-Grating Layout Avoiding Systematic Phase Errors", In Proceedings of Optics Express, vol. 19, No. 9, Apr. 25, 2011, pp. 8781-8794.
Jarvenpaa,"Compact near-to-eye display with integrated gaze tracker", Second International Conference on Computer Engineering and Applications, Mar. 19, 2010, 9 pages.
Johnson,"Samsung Galaxy Tab Pro 10.1 Review", Retrieved From: <http://hothardware.com/Reviews/Samsung-Galaxy-Tab-Pro-101-Review/?page=3#!baG2DY> Jul. 9, 2014, Mar. 21, 2014, 10 Pages.
Kandogan,"Elastic Windows: Improved Spatial Layout and Rapid Multiple Window Operations", In Proceedings of the Workshop on Advanced Visual Interfaces, May 27, 1996, 10 Pages.
Kishore,"Split or Divide Your Desktop Screen into Multiple Parts", retrieved from <http://www.online-tech-tips.com/free-software-downloads/split-or-divide-your-desktop-screen-into-multiple-parts/> on Jul. 7, 2014, Oct. 18, 2008, 7 pages.
L.,"All-Nanoparticle Concave Diffraction Grating Fabricated by Self-Assembly onto Magnetically-Recorded Templates", In Proceedings of Optical Express, vol. 21, Issue 1, Jan. 2013, 1 page.
Lanman,"Near-eye Light Field Displays", In Journal of ACM Transactions on Graphics, vol. 32, No. 6, Nov. 2013, 10 pages.
Levandoski,"Latch-Free, Log-Structured Storage for Multiple Access Methods", U.S. Appl. No. 13/924,567, filed Jun. 22, 2013, 51 pages.
Levandoski,"The Bw-Tree: A B-tree for New Hardware Platforms", In IEEE 29th International Conference on Data Engineering, Apr. 8, 2013, 12 pages.
Mack,"Moto X: The First Two Weeks", Retrieved From: <http://www.gizmag.com/two-weeks-motorola-google-moto-x-review/28722/> Jul. 8, 2014, Aug. 16, 2013, 8 pages.
Mei,"An all fiber interferometric gradient hydrophone with optical path length compensation", In Proceedings of Summaries of Papers Presented at the Conference on Lasers and Electro-Optics, May 28, 1999, 2 pages.
Morga,"History of SAW Devices", In Proceedings of the IEEE International Frequency Control Symposium, May 27, 1998, 22 pages.
Muller,"MultiSplitPane: Splitting without Nesting", Java.net, retrieved from <http://today.java.net/pub/a/today/2006/03/23/multi-split-pane.html> on Mar. 23, 2006, Mar. 23, 2006, 6 pages.
O'Reilly,"How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.
Paul,"Three Windows Multitasking Features That Help Maximize Your Screen Space", Retrieved From: <http://www.pcworld.com/

(56) References Cited

OTHER PUBLICATIONS article/2094124/three-windows-multitasking-features-that-help-maximize-your-screen-space.html> Jul. 4, 2014, Feb. 4, 2014, 4 Pages.

Prohaska,"Fast Updates with TokuDB", Available at: http://www.tokutek.com/2013/02/fast-updates-with-tokudb/, Feb. 12, 2013, 2 pages.

Smalley,"Anisotropic Leaky-Mode Modulator for Holographic Video Displays", In Proceedings of Nature, vol. 498, Jun. 20, 2013, 6 pages.

Teng,"Fabrication of nanoscale zero-mode waveguides using microlithography for single molecule sensing", In Proceedings of Nanotechnology, vol. 23, No. 45, Jul. 7, 2012, 7 pages.

Thurrott,"Nokia Lumia "Black": Glance 2.0", Retrieved From:<http://winsupersite.com/windows-phone/nokia-lumia-black-glance-20> Jul. 8, 2014, Jan. 11, 2014, 3 Pages.

Tien,"Microcontact Printing of SAMs", In Proceedings of Thin Films, vol. 24, May 28, 2014, 24 pages.

Vranjes,"Application Window Divider Control for Window Layout Management", U.S. Appl. No. 13/863,369, filed Apr. 15, 2013, 21 pages.

Wiebe,"Using screen space efficiently with Gridmove", Available at: http://lowerthought.wordpress.com/2010/05/15/using-screen-space-efficiently-with-gridmove/, May 15, 2010, 2 pages.

"Can I see a Skydrive folder in Windows as computer disk?", retrieved from http://forums.techarena.in/technology-internet/1386082.htm on Aug. 5, 2011, 3 pages.

"Final Office Action", U.S. Appl. No. 13/229,554, Dec. 4, 2013, 19 pages.

"Final Office Action", U.S. Appl. No. 13/551,297, Nov. 5, 2014, 18 pages.

"International Search Report and Written Opinion", Application No. PCT/US2015/042187, Oct. 20, 2015, 10 pages.

"International Search Report and Written Opinion", Application No. PCT/US2015/042259, Oct. 12, 2015, 11 pages.

"International Search Report and Written Opinion", Application No. PCT/US2015/041046, Nov. 9, 2015, 15 pages.

"Invitation to Pay Additional Fees", Application No. PCT/US2015/043892, Nov. 4, 2015, 6 pages.

"Non-Final Office Action", U.S. Appl. No. 13/229,554, Aug. 16, 2013, 16 pages.

"Non-Final Office Action", U.S. Appl. No. 13/229,554, Nov. 17, 2014, 25 pages.

"Non-Final Office Action", U.S. Appl. No. 13/551,297, May 23, 2014, 17 pages.

"Non-Final Office Action", U.S. Appl. No. 14/447,419, Feb. 2, 2016, 8 pages.

"Non-Final Office Action", U.S. Appl. No. 14/454,545, Dec. 18, 2015, 16 pages.

"Supplemental Notice of Allowance", U.S. Appl. No. 14/447,464, Jan. 12, 2016, 2 pages.

"Windows Live Logo Windows Live SkyDrive", retrieved from http://toostep.com/trends/india-one-three-chosen-to-test-skydrive-online-storage on Aug. 5, 2011, 2 pages.

"Windows Phone—Pictures Hub", retrieved from http://www.microsoft.com/windowsphone/en-gb/howto/wp7/pictures/pictures-hub.aspx on Jun. 21, 2012, 2012, 2 pages.

Antonopoulos,"Efficient Updates for Web-Scale Indexes over the Cloud", IEEE 28th International Conference on Data Engineering Workshops, Apr. 2012, 8 pages.

Levandoski,"Ranking and New Database Architectures", In Proceedings of the 7th International Workshop on Ranking in Databases, Aug. 2013, 4 pages.

Snavely,"Modeling the World from Internet Photo Collections", International Journal of Computer Vision, vol. 80, Issue 2—Available at <http://phototour.cs.washington.edu/ModelingTheWorld_ijcv07.pdf>, Nov. 2008, 22 pages.

"International Search Report and Written Opinion", Application No. PCT/US2015/043892, Feb. 11, 2016, 19 Pages.

"Non-Final Office Action", U.S. Appl. No. 14/447,109, Feb. 11, 2016, 15 pages.

"Notice of Allowance", U.S. Appl. No. 14/454,545, Apr. 12, 2016, 8 pages.

"Final Office Action", U.S. Appl. No. 14/447,419, May 17, 2016, 10 pages.

"International Search Report and Written Opinion", Application No. PCT/US2015/061713, May 12, 2016, 16 pages.

"Non-Final Office Action", U.S. Appl. No. 14/335,927, Jun. 3, 2016, 8 pages.

"Non-Final Office Action", U.S. Appl. No. 14/448,975, Jul. 1, 2016, 17 pages.

"Second Written Opinion", Application No. PCT/US2015/041909, Jun. 21, 2016, 6 pages.

"Second Written Opinion", Application No. PCT/US2015/041930, Jun. 21, 2016, 5 pages.

"Second Written Opinion", Application No. PCT/US2015/042187, Jun. 30, 2016, 5 pages.

"Second Written Opinion", Application No. PCT/US2015/042226, Jun. 10, 2016, 6 pages.

"Supplemental Notice of Allowance", U.S. Appl. No. 14/454,545, Jun. 30, 2016, 2 pages.

"Final Office Action", U.S. Appl. No. 13/863,369, Aug. 18, 2016, 19 pages.

"Final Office Action", U.S. Appl. No. 14/,447,419, Aug. 29, 2016, 11 pages.

"International Search Report and Written Opinion", Application No. PCT/US2015/054350, Feb. 5, 2016, 9 pages.

"Notice of Allowance", U.S. Appl. No. 14/335,927, Sep. 12, 2016, 7 pages.

"Second Written Opinion", Application No. PCT/US2015/041900, Jun. 30, 2016, 6 pages.

"Second Written Opinion", Application No. PCT/US2015/041965, Jul. 4, 2016, 6 pages.

March,"A Read-Only Distributed Has Table", IN Journal of Grip Computing, vol. 9, Issue 4, Apr. 27, 2011, pp. 501-529.

Elnaka, et al.,' "Real-Time Traffic Classification for Unified Communication Networks", In Proceedings of International Conference on Selected Topics in Mobile and Wireless Networking, Aug. 19, 2013, 6 pages.

Ksentini, "Building the Bridges between QoS and QoE for Network Control Mechanisms", In Dissertation of University of Rennes, Jul. 3, 2013, 66 pages.

Li, et al.,' "QRON: QoS-Aware Routing in Overlay Networks", In Proceedings of IEEE Journal on Selected Areas in Communications, vol. 22, No. 1, Jan. 2004, 12 pages.

"Foreign Notice of Allowance", RU Application No. 2013152630, Jun. 21, 2016, 20 pages.

"Non-Final Office Action", U.S. Appl. No. 14/448,913, Jul. 28, 2016, 29 pages.

"Second Written Opinion", Application No. PCT/US2015/042205, Jul. 8, 2016, 6 pages.

"Second Written Opinion", Application No. PCT/US2015/042218, Jul. 22, 2016, 6 pages.

"Second Written Opinion", Application No. PCT/US2015/042259, Jul. 7, 2016, 7 pages.

"Second Written Opinion", Application No. PCT/US2015/042371, Jun. 27, 2016, 7 pages.

"Second Written Opinion", Application No. PCT/US2015/043892, Jul. 4, 2016, 7 pages.

"Final Office Action", U.S. Appl. No. 14/448,913, Feb. 9, 2017, 25 pages.

"International Preliminary Report on Patentability", Application No. PCT/US2015/042187, Oct. 31, 2016, 7 pages.

"Non-Final Office Action", U.S. Appl. No. 14/448,871, Feb. 17, 2017, 38 pages.

"Restriction Requirement", U.S. Appl. No. 14/447,44, Feb. 9, 2017, 7 pages.

"Examiner's Answer to Appeal Brief", U.S. Appl. No. 14/447,419, Feb. 27, 2017, 8 pages.

"Final Office Action", U.S. Appl. No. 14/447,109, May 8, 2017, 13 pages.

(56) References Cited

OTHER PUBLICATIONS

"Final Office Action", U.S. Appl. No. 14/448,911, Mar. 7, 2017, 28 pages.
"Final Office Action", U.S. Appl. No. 14/448,946, Feb. 24, 2017, 25 pages.
"Non-Final Office Action", U.S. Appl. No. 15/198,628, Apr. 7, 2017, 19 pages.
"Final Office Action", U.S. Appl. No. 13/229,554, Feb. 27, 2015, 29 pages.
"Final Office Action", U.S. Appl. No. 13/229,554, Jun. 16, 2016, 35 pages.
"Final Office Action", U.S. Appl. No. 14/447,262, Nov. 22, 2016, 20 pages.
"Final Office Action", U.S. Appl. No. 14/448,975, Dec. 16, 2016, 22 pages.
"Foreign Notice of Allowance", CN Application No. 201180071183.0, Sep. 27, 2016, 6 pages.
"International Preliminary Report on Patentability", Application No. PCT/US2015/041900, Oct. 11, 2016, 6 pages.
"International Preliminary Report on Patentability", Application No. PCT/US2015/042226, Nov. 2, 2016, 7 pages.
"International Preliminary Report on Patentability", Application No. PCT/US2015/042218, Nov. 3, 2016, 7 pages.
"International Preliminary Report on Patentability", Application No. PCT/US2015/042205, Nov. 8, 2016, 7 pages.
"International Preliminary Report on Patentability", Application No. PCT/US2015/042259, Sep. 16, 2016, 8 pages.
"International Preliminary Report on Patentability", Application No. PCT/US2015/043892, Oct. 10, 2016, 8 pages.
"International Preliminary Report on Patentability", Application No. PCT/US2015/042371, Oct. 20, 2016, 8 pages.
"International Preliminary Report on Patentability", Application No. PCT/US2015/041930, Oct. 26, 2016, 9 pages.
"Non-Final Office Action", U.S. Appl. No. 13/229,554, Feb. 3, 2016, 33 pages.
"Non-Final Office Action", U.S. Appl. No. 14/447,109, Dec. 20, 2016, 9 pages.
"Non-Final Office Action", U.S. Appl. No. 14/447,190, Nov. 8, 2016, 10 pages.
"Non-Final Office Action", U.S. Appl. No. 14/448,911, Oct. 31, 2016, 22 pages.
"Non-Final Office Action", U.S. Appl. No. 14/448,946, Oct. 27, 2016, 17 pages.
"Non-Final Office Action", U.S. Appl. No. 14/746,298, Aug. 28, 2015, 6 pages.
Schrauwen,"Focused-Ion-Beam Fabrication of Slanted Grating Couplers in Silicon-on-Insulator Waveguides", IEEE Photonics Technology Letters, vol. 19, Issue 11, Jun. 1, 2007, 3 pages.
"Non-Final Office Action", U.S. Appl. No. 14/447,446, Jun. 9, 2017, 15 pages.
"Advisory Action", U.S. Appl. No. 14/448,913, Jun. 14, 2017, 3 pages.
"Final Office Action", U.S. Appl. No. 14/448,871, Aug. 24, 2017, 42 pages.
"Non-Final Office Action", U.S. Appl. No. 14/448,975, Jul. 28, 2017, 17 pages.

* cited by examiner

PROPAGATING ROUTING AWARENESS FOR AUTONOMOUS NETWORKS

RELATED APPLICATION

This application claims priority under 35 U.S.C. §119(e) to U.S. Provisional Patent Application No. 62/031,748, filed on Jul. 31, 2014 and titled "Propagating Routing Awareness for Autonomous Networks," the entire disclosure of which is incorporated in its entirety by reference herein.

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges. For instance, a UC&C system typically utilizes multiple interconnected networks to route various communications. Since different networks may be managed by different entities, challenges thus arise in managing communications quality for communications that are routed among independently managed networks. Further, UC&C is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for propagating routing awareness for autonomous networks are described. In at least some embodiments, routing awareness refers to attributes of autonomous networks that route communication sessions between different endpoints. According to various embodiments, routing awareness indicates whether a particular autonomous network supports a protocol for propagating routing awareness among different autonomous networks. Routing awareness may also include performance attributes of autonomous networks. Such routing awareness enables entities involved in routing communication sessions to make informed decisions regarding routing and handling of communication sessions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for propagating routing awareness for autonomous networks are described. In at least some embodiments, routing awareness refers to attributes of autonomous networks that route communication sessions between different endpoints. Generally, a communication session refers to a real-time exchange of communication media between different communication endpoints. Examples of a communication session include a Voice over Internet Protocol (VoIP) call, a video call, text messaging, a file transfer, content sharing, and/or combinations thereof. In at least some embodiments, a communication session represents a Unified Communication and Collaboration (UC&C) session.

According to various implementations, routing awareness indicates whether a particular autonomous network supports a protocol for propagating routing awareness among different autonomous networks. Such a protocol is discussed in more detail below, but generally refers to procedures for propagating attributes of autonomous networks and communication sessions out-of-band from the communication sessions themselves. Thus, propagation of routing awareness is independent from routing and handling of communication sessions.

According to various implementations, routing awareness includes performance attributes of autonomous networks, such as indications of communication session quality and/or errors that occur across different autonomous networks. Thus, techniques discussed herein provide diverse scenarios for enlightening different autonomous networks with routing awareness. Such routing awareness enables entities involved in routing communication sessions to make informed decisions regarding routing and handling of communication session data.

In the following discussion, an example environment is first described that is operable to employ techniques described herein. Next, a section entitled "Propagating Routing Awareness" discusses some example ways for propagating routing awareness in accordance with one or more embodiments. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
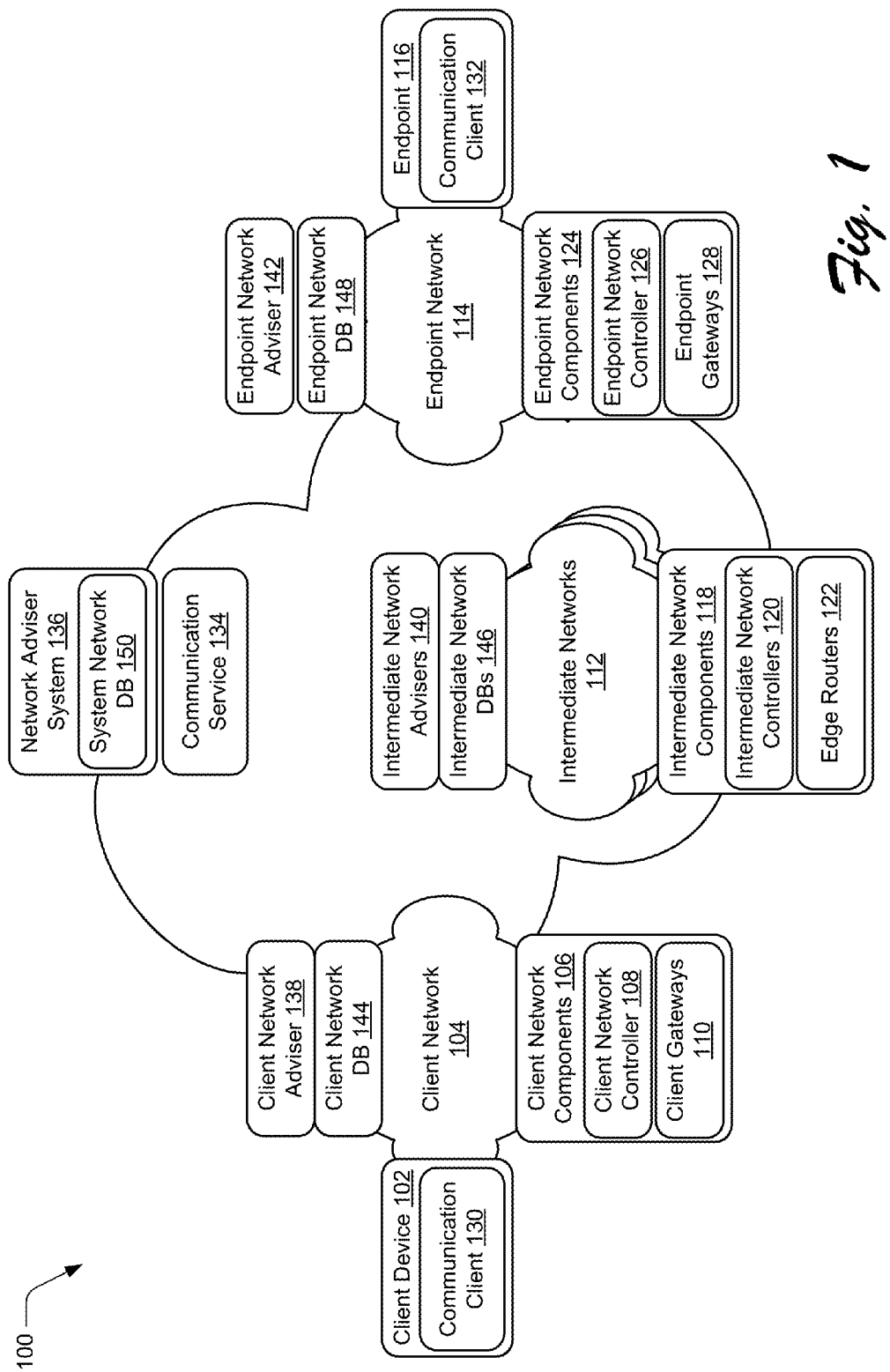
FIG. 1 is an illustration of an environment in an example implementation that is operable to employ techniques discussed herein.

FIG. 1 is an illustration of an environment 100 in an example implementation that is operable to employ techniques for propagating routing awareness for autonomous networks described herein. Generally, the environment 100 includes various devices, services, and networks that enable communication via a variety of different modalities. For instance, the environment 100 includes a client device 102 connected to a client network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The client network 104 is representative of a network that provides the client device 102 with connectivity to various networks and/or services, such as the Internet. The client network 104 may be provided and/or managed by a particular enterprise entity, such as an Internet Service Provider (ISP). For instance, the client network 104 represents a local access provider (LAP) network that provides the client device 102 with network connectivity. The client access network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth.

The client network 104 includes client network components 106, which are representative of different infrastructure components of the client network 104, such as hardware and logic for implementing and maintaining the client network 104. Examples of the client network components 106 include network switches, routers, gateways, and so forth. The client network components 106, for instance, include a client network controller 108 and client gateways 110. The client network controller 108 is representative of functionality to manage various aspects of the client network 104, such as connectivity and routing of the client network components 106. The client gateways 110 are representative of functionality for routing data from the client network 104 to other networks. Examples of the client gateways 110 include a border router, a customer-premises equipment (CPE) router, and/or other device that interfaces with other networks to exchange data.

According to various implementations, the client network controller 108 maintains state awareness of the various client network components 106. For example, the client network controller 108 maintains a mapping of the client network components 106 (e.g., in terms of location) and performance attributes of the client network controller 108, such as signal quality for the different client network controller 108, quality of service (QoS) attributes of the client network controller 108, and so forth.

The client network controller 108, for instance, includes connectivity and logic that accesses routing information for the client network components 106. For example, the client network controller 108 can access an Interior Gateway Protocol (IGP) and/or spanning tree switching topology for client the network components 106. This enables the client network controller 108 to identify different data routing paths within the client network 104, and to map and remap the different routing paths.

Connected to the client network 104 are intermediate networks 112, which in turn are connected to an endpoint network 114. The intermediate networks 112 and the endpoint network 114 are representative of different types and instances of wired and wireless networks that may be implemented and managed by different respective entities and according to a variety of different networking technologies, such as such as broadband cable, digital subscriber line (DSL), wireless cellular, wireless data connectivity (e.g., WiFi™), T-carrier (e.g., T1), Ethernet, and so forth.

According to various implementations, connectivity between the client network 104, the intermediate networks 112, and the endpoint network 114 provides different communication paths between the client device 102 and an endpoint 116. The endpoint 116 is representative of devices and/or functionalities with which the client device 102 may communicate.

The intermediate networks 112 include intermediate network components 118, which in turn include intermediate network controllers 120 and edge routers 122. Generally, the intermediate network components 118 are representative of different infrastructure components of the intermediate networks 112, such as hardware and logic for implementing and maintaining the intermediate networks 112. The intermediate network controllers 120 are representative of functionalities to manage various aspects of the intermediate networks 112, such as connectivity and routing of the intermediate network components 118. The edge routers 122 are representative of functionality for routing data from the intermediate networks 112 to other networks, such as the client network 104 and the endpoint network 114. According to various implementations, one or more of the edge routers 122 interface with one or more of the client gateways 110 to provide peering points between the client network 104 and the intermediate networks 112.

The endpoint network 114 includes endpoint network components 124, which in turn include an endpoint network controller 126 and endpoint gateways 128. Generally, the endpoint network controller 126 is representative of functionality to manage various aspects of the endpoint network 114, such as connectivity and routing for the endpoint network components 124. The endpoint gateways 128 are representative of functionality for routing data from the endpoint network 114 to other networks, such as the intermediate networks 112. For instance, one or more of the edge routers 122 interface with one or more of the endpoint gateways 128 to provide peering points between the endpoint network 114 and the intermediate networks 112. Example attributes and aspects of the endpoint network components 124 are discussed above with reference to the client network components 106.

According to various implementations, communication between the client device 102 and the endpoint 116 is facilitated via a communication client 130 of the client device 102, and a communication client 132 of the endpoint 116. Generally, the communication clients 130, 132 are representative of functionalities to enable different forms of communication via the client device 102 and the endpoint 116. Examples of the communication clients 130, 132 include a voice communication application (e.g., a VoIP client), a video communication application, a messaging application, a content sharing application, and combinations thereof. The communication clients 130, 132 for instance, enable different communication modalities to be combined to provide diverse communication scenarios.

In at least some implementations, the communication clients 130, 132 represent interfaces to a communication service 134. Generally, the communication service 134 is representative of a service to perform various tasks for management of communication between the client device 102 and the endpoint 116. The communication service 134, for instance, can manage initiation, moderation, and termination of communication sessions between the communication clients 130, 132.

The communication service 134 maintains a presence across many different networks and can be implemented according to a variety of different architectures, such as a cloud-based service, a distributed service, a web-based service, and so forth. Examples of the communication service 134 include a VoIP service, an online conferencing service, a UC&C service, and so forth. In at least some embodiments, the communication service 134 may be implemented as or be connected to a private branch exchange (PBX) in communication with a Public Switched Telephone Network ("PSTN") to enable voice communication between the client device 102 and other endpoints, such as the endpoint 116.

Further to techniques for propagating routing awareness for autonomous networks discussed herein, the environment 100 includes a network adviser system 136. Generally, the network adviser system 136 is representative of functionality propagate routing awareness to different entities. "Routing awareness," for instance, refers to information pertaining to routing paths for routing data between the client device 102 and the endpoint 116 over the intermediate networks 112. In at least some implementations, routing awareness includes attributes of different networks and is independent of a particular communication session. Additionally, routing awareness may include data about specific instances of communication sessions, attributes of networks involved in routing communication sessions, users that participate in communication sessions, and so forth. Further details concerning routing awareness are described below.

According to various implementations, the network adviser system 136 interfaces with a client network adviser 138 of the client network 104, intermediate network advisers 140 of the intermediate networks 112, and an endpoint network adviser 142 of the endpoint network 114. The network adviser system 136 can receive routing awareness from the different network advisers, and can propagate routing awareness among the different network advisers to enable the individual networks to maintain state awareness of routing attributes of different networks and thus make intelligent decisions to optimize communication session performance. In at least some implementations, the network advisers can be deployed in the different networks as agents of the network adviser system 136. Alternatively, the network advisors may be deployed and/or implemented independently of the network adviser system 136.

According to various implementations, the network advisers are representative of functionality to receive routing awareness pertaining to different networks, propagate routing awareness to network components of their respective networks (e.g., their respective network controllers), and to maintain state awareness of routing attributes of their respective networks. The client network adviser 138, for instance, is representative of functionality to interface with the client network controller 108 and/or other client network components 106 and serve as an information portal between the client network components 106 and other entities, such as the network adviser system 136 and/or other network advisers.

The intermediate network advisers 140 are representative of functionalities to interface with the intermediate network controllers 120 and/or other intermediate network components 118, and serve as information portals between the intermediate network components 118 and other entities, such as the network adviser system 136 and/or other network advisers. According to various implementations, at least some of the intermediate networks 112 each include a different respective instance of the intermediate network advisers 140. This is not to be construed as limiting, however, and as detailed below, some of the intermediate networks 112 do not include a respective network adviser 140 and thus do not support techniques for propagating routing awareness for autonomous networks discussed herein. For purposes of discussion herein, such networks are referred to as "non-supportive networks."

The endpoint network adviser 142 is representative of functionality to interface with the endpoint network controller 126 and/or other endpoint network components 124, and serve as an information portal between the endpoint network components 124 and other entities, such as the network adviser system 136 and/or other network advisers. Unless one of the client network adviser 138, the intermediate network advisers 140, or the endpoint network adviser 142 is specifically referenced, the term "network adviser" as used herein may refer to one or all of the client network adviser 138, the intermediate network advisers 140, or the endpoint network adviser 142.

According to one or more implementations, the network adviser system 136 may be implemented and/or maintained by the communication service 134, such as to propagate routing awareness for communication sessions managed by the communication service 134. Alternatively, the network adviser system 136 may be implemented separately and/or independently from the communication service 134. The network adviser system 136, for instance, may aggregate and propagate routing awareness for different entities and/or systems involved in communication sessions, such as different communication clients and communication services.

A client network database (DB) 144 is maintained for the client network 104, and is representative of functionality to track various types of routing information for the client network 104. For instance, the client network DB 144 may be employed to track state information for various client network components 106, such as performance attributes and statistics for the client network components 106. The client network controller 108, for example, can communicate state information for the client network components 106 to the client network adviser 138, which stores the state information as part of the client network DB 144. Alternatively or additionally, the client network controller 108 may interact with the client network DB 144 directly, such as to populate information to and retrieve information from the client network DB 144. According to various implementations, information from the client network DB 144 can be employed to make various decisions, such as for determining routing paths for communication sessions of the client device 102. As further detailed below, the client network DB 144 may be employed to store state information for other networks, such as the intermediate networks 112 and the endpoint network 114.

Intermediate network databases (DBs) 146 are maintained for the intermediate networks 112, and are representative of functionalities to track various types of information for the intermediate networks 112. According to various implementations, individual of the intermediate networks 112 each include different a respective instance of the intermediate network DBs 146. For instance, individual the intermediate network DBs 146 may be employed to track state information for respective intermediate network components 118, such as performance attributes and statistics for the intermediate network components 118 for a respective intermediate network 112. The intermediate network DBs may also store state information for other networks, such as other intermediate networks 112, the client network 104, the endpoint network 114, and so forth. Further aspects and functionalities of the intermediate network DBs 146 are discussed above with reference to the client network DB 144.

An endpoint network database (DB) 148 is maintained for the endpoint network 114, and is representative of functionality to track various types of information for the endpoint network 114. For instance, the endpoint network DB 148 may be employed to track state information for various endpoint network components 124, such as performance attributes and statistics for the endpoint network components 124. The endpoint network DB may also store state information for other networks, such as one or more of the intermediate networks 112, the client network 104, and so forth. Further aspects and functionalities of the endpoint network DB 148 are discussed above with reference to the client network DB 144.

According to one or more implementations, the network adviser system 136 maintains a system network database (DB) 150, which is representative of functionality to track various information pertaining to the different networks of the environment 100. For example, the system network DB 150 maintains active state awareness (e.g., routing awareness) of network attributes of the client network 104, the intermediate networks 112, and the endpoint network 114. The system network DB 150, for instance, tracks whether specific networks support the protocols for propagation of routing awareness discussed herein, are partially supportive, or are non-protocol supportive. Other examples of network attributes that may be tracked by the system network DB 150 include performance attributes, such as current and historical performance attributes of communication sessions across the different networks.

The system network DB 150 may also track routing awareness for various current and historical communication sessions, such as identifiers for individual communication sessions, endpoints involved in individual communication sessions, networks through which individual communication sessions are routed, performance attributes of the communication sessions, and so forth. As further detailed herein, routing awareness pertaining to a communication session can be propagated out-of-band from data of the communication session itself. Thus, decisions concerning handling and routing of communication session data may be made without processing and/or handling the actual communication session data.

In at least some implementations, routing awareness pertaining to communication sessions and/or network conditions can be propagated among the different network advisers to provide end-to-end awareness of conditions that may affect a communication session. For instance, the network advisers may communicate with one another to share routing awareness independently of the network adviser system 136. Alternatively or additionally, routing awareness may be propagated from the individual network advisers to the network adviser system 136, which may aggregate the information as part of the system network DB 150. The network adviser system 136 may share routing awareness among the different networks to enable routing awareness to be propagated to entities involved in routing and handling communication sessions. As yet another implementation, the individual network controllers may communicate directly with the network adviser system 136 to send and receive routing awareness.

Generally, the client network 104, the individual intermediate networks 112, and the endpoint network 114 each represent individual autonomous networks that connect with each other via their respective peering points, e.g., gateways, edge routers, and so forth. The different networks, for instance, may be implemented and managed by different entities, such as different infrastructure and service providers. Thus, implementations discussed herein provide for a variety of different environments in which routing awareness may be propagated among different autonomous networks involved in routing and/or handling communication sessions.

According to various implementations, the client network 104, one or more the intermediate networks 112, and the endpoint network 114 may be implemented as software-defined networks (SDN). In such implementations, respective network advisers for the SDN networks represent SDN controllers that may receive, process, and propagate routing awareness.

Various entities discussed herein may be referred to in both plural and singular implementations. When an entity is discussed in both plural and singular implementations, a reference to a singular implementation refers to an instance of the plural implementation. For example, a reference to an intermediate network 112 refers to a particular instance of the intermediate networks 112.

Having described an example environment in which the techniques described herein may operate, consider now a discussion of example ways of propagating routing awareness in accordance with one or more embodiments.

Propagating Routing Awareness

According to various embodiments, techniques can be employed to dynamically enlighten various entities with routing awareness, such as information about network conditions, information about communication sessions, and so forth. For instance, notification events can be generated that include various attributes of networks and communication sessions. The notification events can be propagated to different entities further to techniques for propagating routing awareness for autonomous networks discussed herein.

In at least some embodiments, notification events can be configured using a communication application programming interface (API) that can be leveraged to configure and communicate routing awareness to various entities involved in communication sessions. For example, the communication API can identify dialogue events and session events for which attributes of networks and/or communication sessions can be identified. Consider, for instance, the following events and attributes that may be conveyed via a notification event generated using the communication API:

Dialogue Events—

These events apply to various portions of a communication session, such as the start, update, and end of a communication session. A dialogue event can include one or more of the following example attributes.

(1) Network Identifier: This attribute can be leveraged to identify a network, such as a network from which a dialogue event is received. In at least some implementations, the network identifier may include an autonomous system (AS) number that identifies a particular network. With reference to the environment 100, for instance, the network identifier may identify the client network 104, an intermediate network 112, and/or the endpoint network 114.

(2) Timestamp: This attribute can be leveraged to specify timestamps for a start of a communication session, updates that occur during a communication session, and an end (e.g., termination) of a communication session.

(3) Source IP Address: This attribute can be leveraged to specify an IP address for a device that is a source of media during a communication session, e.g., a device that initiates a communication session. With reference to the environment 100, for instance, the source IP address may be for the client device 102 or the endpoint 116.

(4) Destination IP Address: This attribute can be leveraged to specify an IP address for a device that is to receive media as part of a communication session. With reference to the environment 100, for instance, the destination IP address may be for the client device 102 or the endpoint 116.

(5) Transport Type: This attribute can be leveraged to specify a transport type or combination of transport types for a communication session. Examples of transport types include Transmission Control Protocol (TCP), User Datagram Protocol (UDP), and so forth.

(6) Source Port: this attribute can be leveraged to specify an identifier for a port at a source device, e.g., a source device identified by the Source IP Address referenced above.

(7) Destination Port: This attribute can be leveraged to specify an identifier for a port at a destination device, e.g., a destination device identified by the Destination IP Address referenced above.

(8) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the service policies discussed herein.

(9) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(10) To: This attribute can be leveraged to identify a user to which media in a communication session is to be transmitted.

(11) From: This attribute can be leveraged to identify a user from which media in a communication session is transmitted.

(12) Codec: This attribute can be leveraged to specify a codec or codecs utilized as part of a communication session.

(13) Error Code: This attribute can be leveraged to specify various error codes for errors that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Network Performance Events—

These events can be generated and applied to specify various network attributes, as well as behaviors and performance parameters that are observed for a particular network. For instance, a network performance event may be communicated to a particular entity (e.g., a network adviser) to provide the entity with routing awareness. A network performance event may include one or more of the attributes discussed above with reference to Dialogue Events, and may also include one or more of the following attributes.

(1) Supportive Network: This attribute can be leveraged to indicate whether a particular network supports a protocol for propagating routing awareness ("supportive"), is partially supportive ("partial"), or does not support propagation of routing awareness ("non-supportive"). In at least some implementations, a routing awareness protocol can be identified via a custom protocol ID and/or protocol number that differentiates the protocol from other protocols.

(2) Mean Opinion Score (MOS) levels: This attribute can be leveraged to indicate a MOS observed for communication sessions that traverse a particular network. The MOS for a network, for instance, can be determined by averaging MOS over multiple different communication sessions.

(3) Jitter Inter-Arrival Time: This attribute can be leveraged to specify jitter values observed for communication session data in a particular network.

(4) Packet Loss Rate: This attribute can be leveraged to specify packet loss rate observed for communication session data in a particular network.

(5) Round Trip Delay (RTD): This attribute can be leveraged to specify RTD values observed for communication session data in a particular network.

(6) Concealment Ratio: This attribute can be leveraged to indicate an observed cumulative ratio of concealment time over speech time observed for communication session data in a particular network.

(7) Routing Policy: This attribute can be leveraged to specify different routing policies, such as security policies, service level policies, quality of service (QoS) policies, and so forth. A routing policy, for instance, may be specific to particular networks, to individual communication sessions, and so forth.

(8) Network Preference: This attribute can be leveraged to identify preference levels for particular networks, such as particular networks that may be preferred to be utilized for routing communication sessions. In at least some implementations, a whitelist, a greylist, and/or a blacklist of networks may be implemented. A network whitelist, for instance, identifies preferred networks that are supportive of propagating routing awareness, that are associated with acceptable performance quality when handling communication session data, are known to implement validated security procedures, and so forth. A network blacklist may identify networks that are known to not meet various criteria, such as networks that are known to be non-supportive, networks that implement outdated security protocols, networks in unsecure locations (e.g., geographical locations), and so forth. A network greylist may identify networks whose attributes are not known, e.g., networks without sufficient information to be placed in a whitelist or a blacklist.

Thus, various notifications discussed herein can include one or more of the attributes discussed above and can be used to propagate routing awareness to various entities. In at least some implementations, attributes can be linked to particular networks and/or network components to characterize performance attributes of the networks and/or network components.

Having described an example ways of propagating routing awareness, consider now some example implementation scenarios for propagating routing awareness in accordance with one or more embodiments.

Example Implementation Scenarios

The following section describes example implementation scenarios for propagating routing awareness in accordance with one or more implementations. The implementation scenarios may be implemented in the environment 100 discussed above, and/or any other suitable environment.

Figure 2:
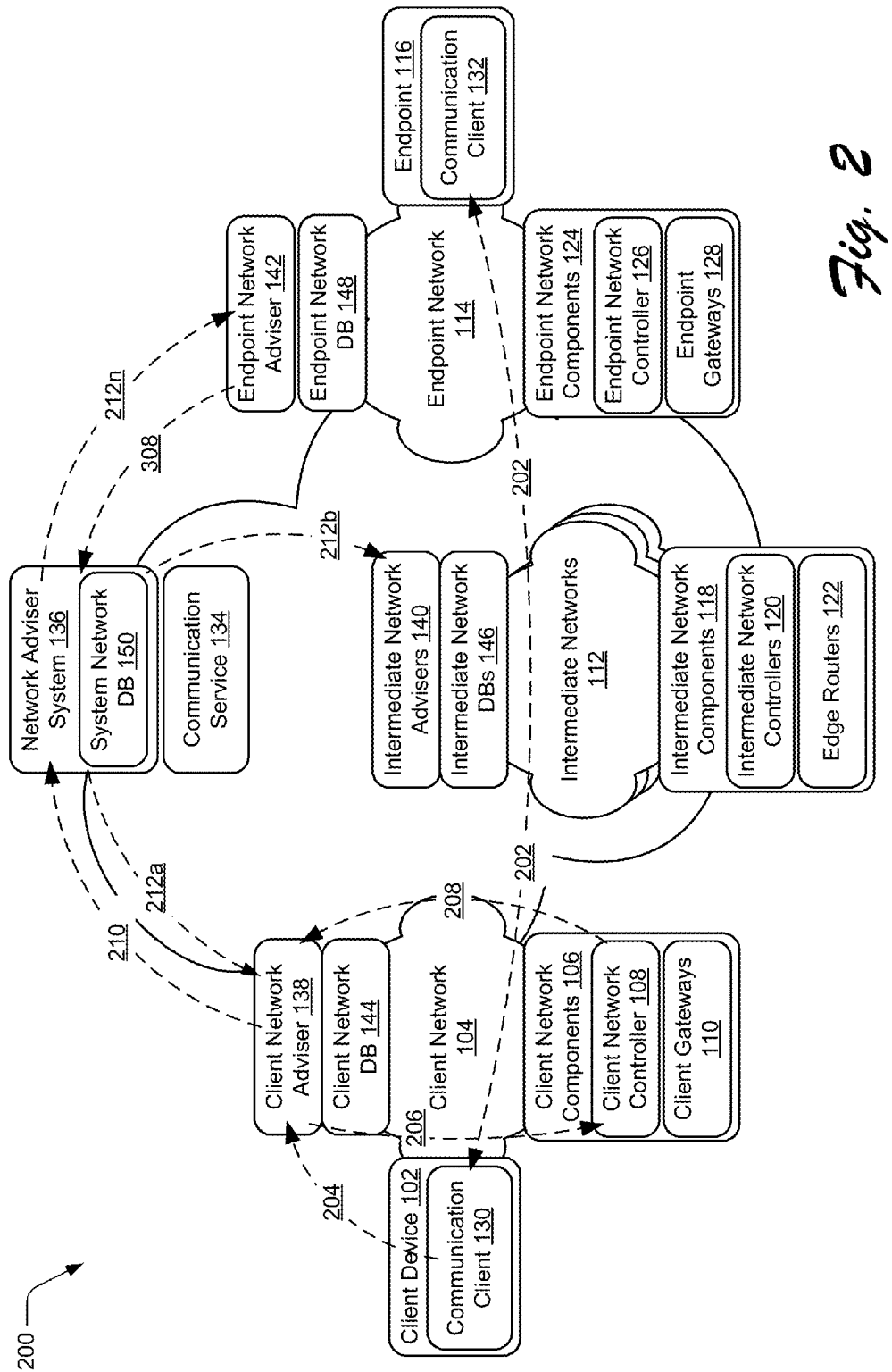
FIG. 2 illustrates an example implementation scenario for aggregating routing awareness in accordance with one or more embodiments.

FIG. 2 illustrates an example implementation scenario 200 for aggregating routing awareness in accordance with one or more implementations. The scenario 200 includes various entities and components introduced above with reference to the environment 100.

In the scenario 200, a communication session 202 is initiated or scheduled to be initiated between the client device 102 and the endpoint 116. For instance, a user enters a request to initiate the communication session 202 with the endpoint 116. Alternatively, the communication session 202 represents a scheduled communication session that is scheduled to occur at a future time, such as in association with a scheduled meeting or other calendar event.

In response to the request to initiate the communication session, a routing path for the communication session 202 is determined between the client device 102 and the endpoint 116. According to various implementations, the routing path for routing the communication session is selected using any suitable algorithm, such as a shortest path algorithm applied by the client network controller 108, the intermediate network controllers 120, and/or the endpoint network controller 126. In at least some embodiments, the routing path is derived based on a particular routing protocol, such as Border Gateway Protocol (BGP).

Further in response to the request to initiate the communication session 202, the communication client 130 sends a start dialogue event 204 to the client network adviser 138. The start dialogue event 204 includes information to uniquely identify the communication session 202. For instance, the notification event referenced above can be used to communicate attributes of the communication session 202, such as Source and Destination identifiers, Port numbers, Session type, codec, and so forth.

Based on the start dialogue event 204, the client network adviser 138 communicates a session query 206 the client network controller 108 for information about the communication session 202. Generally, the session query 206 includes information from the start dialogue event 204, such as to identify the communication session 202. The session query 206 also requests routing information for the communication session 202. For instance, the session query 202 includes a request to perform a traceroute procedure to identify networks and/or network components through which the communication session 202 is or would be routed to the endpoint 116.

In response to the session query 206, the client network controller 108 determines routing path information for the communication session 202 within the client network 104, such as an identifier for a particular client gateway 110 via which the communication session 202 is exiting the client network 104 to the intermediate networks 112. In at least some implementations, the client network controller 108 determines different networks (e.g., intermediate networks 112) through which the communication session is routed. For instance, the client network controller 108 may implement a traceroute procedure to identify such networks.

The client network controller 108 generates a session response 208 that includes the routing information. The session response 208 may also be populated with other information, such as performance attributes of the routing path in the client network 104. Examples of such performance attributes include available bandwidth, packet error rate, jitter, packet loss rate, and so forth, observed across the routing path. The client network controller then communicates the session response 208 to the client network adviser 138.

Further to the scenario 200, the client network adviser 138 generates a client session notification 210 that is populated with information from the start dialogue event 204 and the session response 208, such as identifiers for endpoints involved in the communication session 202, routing information (e.g., a client gateway 110 from which the communication session is exiting the client network 104), performance attributes of the routing path, and so forth. The client network adviser 138 communicates the client session notification 210 to the network adviser system 136.

The network adviser system 136 receives the client session notification 210 and ascertains the various information and attributes specified in the notification. Based on these attributes, the network adviser system 136 identifies the intermediate networks 112 through which the communication session 202 is routed. The intermediate networks 112 may be identified in various ways, such as via autonomous system (AS) numbers specified for the networks.

The network adviser system 136 attempts to match the network identifiers (IDs) for the routing path of the communication session 202 to networks identified in the system network DB 150. Generally, the system network DB 150 correlates individual network IDs with attributes of the individual networks. Examples of different network attributes are detailed elsewhere herein, and include whether an individual network is supportive of protocols for propagation of routing awareness discussed herein.

In at least some implementations, the system network DB 150 includes a modified routing table that specifies different network routes between the client device 102 and the endpoint 116. For the different routes, the system network DB 150 may specify whether individual intermediate networks 112 are supportive networks, and performance attributes for the individual intermediate networks 112. The system network DB 150 may also specify whether the individual intermediate networks 112 are listed on a network whitelist, a network blacklist, or a network greylist, examples of which are discussed above.

Based on matching the network IDs to the system network DB 150, the network adviser system 136 generates routing awareness of the routing path of the communication session 202 that includes attributes of one or more of the identified networks. The network adviser system 136 communicates routing awareness 212a to the client network adviser 138, routing awareness 212b to the intermediate network advisers 140 along the routing path of the communication session 202, and routing awareness 212n to the endpoint network adviser 142. Generally, the routing awareness 212a, 212b, 212n includes attributes of the different networks along the routing path of the communication session 202, examples of which are discussed above.

According to one or more implementations, the routing awareness 212a, 212b, 212n may include instructions to the different network advisers that specify which intermediate networks 112 are to be used for routing the communication session 202. For instance, if particular intermediate networks 112 are determined to be protocol-supportive networks and others are determined to be non-supportive, the routing awareness 212a, 212b, 212n may specify that the protocol-supportive networks are to be utilized instead of the non-supportive networks. Based on such instructions, the communication session 202 may be rerouted through one or more different intermediate networks 112.

Alternatively or additionally, the routing awareness 212a, 212b, 212n may provide information or suggestions for networks, such as IDs for networks that are preferred over other networks. The individual network advisers and/or network controllers may consider the routing awareness 212a, 212b, 212n in deciding on a routing path for routing the communication session. For instance, a network adviser for a particular network may decide whether to route (e.g., reroute) the communication session 202 to a suggested network based on routing policies for the particular network. Examples of different routing policies are discussed above.

As referenced above, one or more of the intermediate networks 112 are not considered protocol-supportive networks. Thus, in at least some implementations, routing awareness is not propagated to such non-supportive networks.

Thus, the scenario 200 illustrates that in at least some implementations, the network adviser system 136 can serve to aggregate routing awareness from different networks. The network adviser system 136, for instance, serves as a centralized service that can receive, aggregate, and propagate routing awareness.

Figure 3:
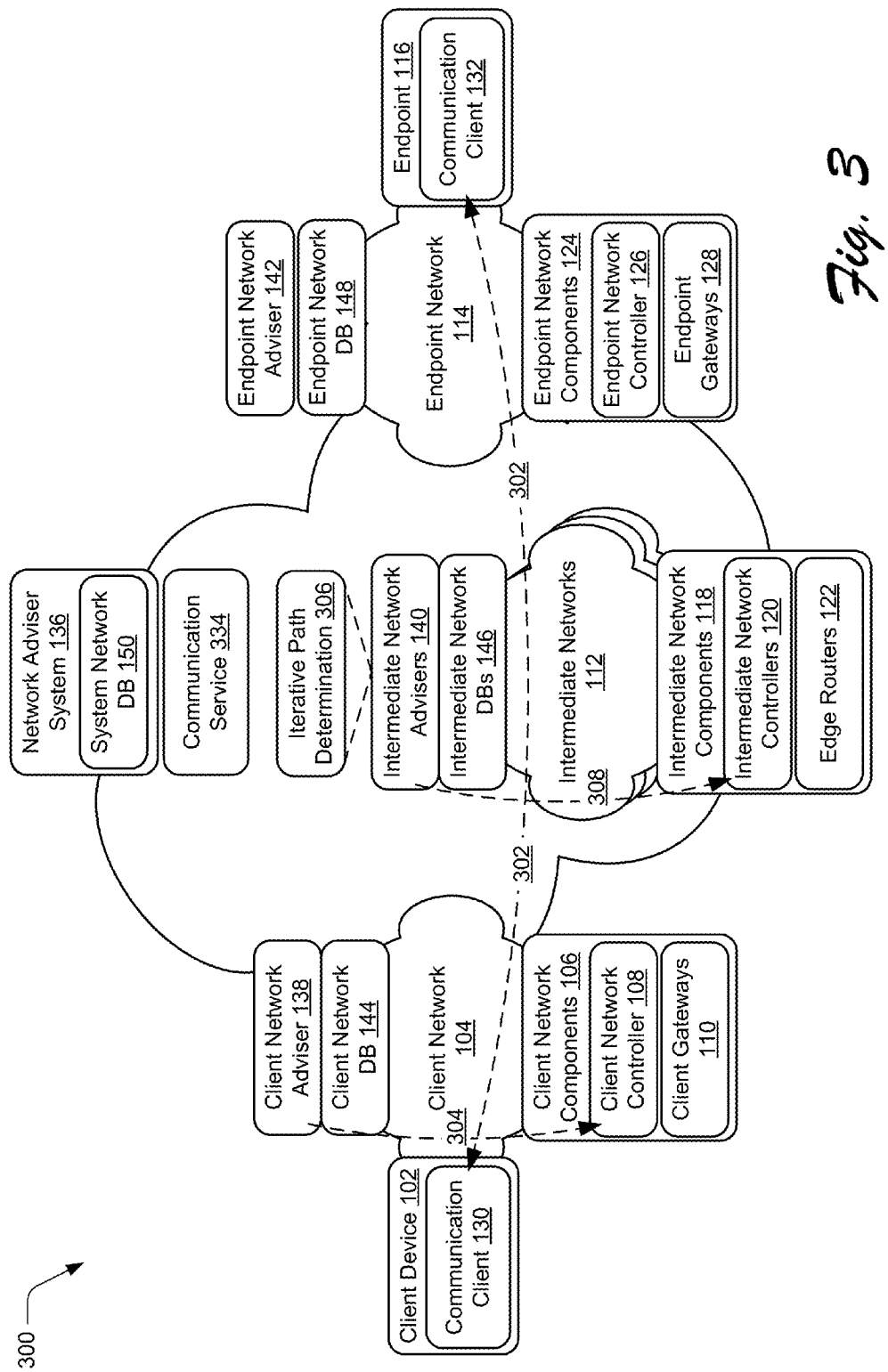
FIG. 3 illustrates an example implementation scenario for determining routing path awareness among autonomous networks in accordance with one or more embodiments.

FIG. 3 illustrates an example implementation scenario 300 for determining routing path awareness among autonomous networks in accordance with one or more implementations. The scenario 300 includes various entities and components introduced above with reference to the environment 100. In at least some implementations, the scenario 300 represents an alternative or additional scenario to the scenario 200.

In the scenario 300, a communication session 302 is initiated or scheduled to be initiated between the client device 102 and the endpoint 116. Accordingly, the client network adviser 138 ascertains initial path routing information for the communication session 302 across the client network 104. Example ways of ascertaining path routing information are discussed above, and may include querying the client network controller 108 for the path routing information. The client network controller 108, for instance, utilizes BGP to initially ascertain a shortest path between the client device 102 and the endpoint 116.

Starting with the initial routing path information, the client network adviser 138 identifies a next intermediate network 112 to which to route the communication session 302. For instance, the client network adviser 138 ascertains whether the next intermediate network 112 identified as part of the shortest path determination is a protocol-supportive network. The client network adviser 138 may do this in various ways, such as by checking an ID for the next network against the client network DB 144, querying the next intermediate network 112 as to whether it is a supportive network, querying the network adviser system 136 as to whether the next intermediate network 112 is a supportive network, and so forth.

If the next intermediate network 112 is identified as a supportive network, the client network adviser 138 may update the client network DB 144 to indicate that the next intermediate network 112 is an awareness protocol-supportive network. For instance, a record entry that identifies the next intermediate network 112 may be created or updated to indicate that the next client network 104 is a supportive network. According to various implementations, the client network adviser 138 may also communicate a notification to the network adviser system 136, which may update the system network DB 150 to indicate that the next client network 104 is a supportive network.

For purposes of the scenario 300, assume that the next intermediate network 112 is not identified as a protocol-supportive network. Accordingly, the client network adviser 138 queries whether other intermediate networks 112 are protocol-supportive networks. The client network adviser 138 may do this in various ways, such as by checking IDs for the other intermediate networks 112 against the client network DB 144, querying other intermediate networks 112 as to whether they are supportive networks, querying the network adviser system 136 as to whether the other intermediate networks 112 are supportive networks, and so forth.

Based on the query for a protocol-supportive network, the client network adviser 138 identifies a different intermediate network 112 that is a supportive network. Accordingly, the client network adviser 138 communicates a routing notification 304 to the client network controller 108 that identifies the different intermediate network 112 as being a preferred network for routing the communication session 302. The routing notification 304, for instance, may include an instruction to reroute the communication session 302 from the next intermediate network 112 to the different intermediate network 112. Alternatively, the routing notification 304 may identify that the different intermediate network 112 is a preferred routing path for the communication session 302, and the client network controller 108 may decide whether to reroute the communication session 302 to the different intermediate network 112. For instance, based on network policy for the client network 104, the client network controller 108 may ascertain whether rerouting to the different intermediate network 112 is preferred and/or permitted.

Continuing with the scenario 300, the communication session 302 is rerouted to the different intermediate network 112. According to various implementations, the rerouting may occur dynamically while the communication session 302 is in progress. In implementations where the communication session 302 is not yet initiated, the rerouting may be effective to reconfigure a routing path for the communication session 302 such that when the communication session 302 is initiated, the communication session 302 is routed through the different intermediate network 112.

Further to the scenario 300, the iterative path determination performed by the client network adviser 138 is performed by intermediate network advisers 140 for intermediate networks 112 through which the communication session 302 is routed to the endpoint 116. For instance, an iterative path determination 306 is performed by an intermediate network adviser 140 for the different intermediate network 112, as well as other intermediate network advisers 140 for intermediate networks 112 through which the communication session 302 is routed. Individual intermediate network advisers 140, for example, each perform the iterative path determination 306.

According to various implementations, the iterative path determination 306 is representative of a procedure to identify preferred path candidates for routing the communication session 302 based on whether particular intermediate networks 112 are supportive networks. For instance, the iterative path determination 306 attempts to identify a shortest path between the client network 104 and the endpoint network 114 that includes the highest proportion of protocol-supportive intermediate networks 112. The iterative path determination 306 may also be based on other network policies, such as the routing policies discussed above. Generally, the iterative path determination 306 represents an example way of generating routing awareness, such as for routing the communication session 302.

Based on the iterative path determination 306, individual intermediate network advisers 140 may communication routing notifications 308 to respective instances of the intermediate network controllers 120. According to various implementations, the routing notifications 308 may include an instruction to reroute the communication session 302 to different intermediate networks 112. Alternatively, the routing notifications 308 may identify that different intermediate networks 112 are preferred routing paths for the communication session 302, and the respective intermediate network controllers 120 may decide whether to reroute the communication session 302 accordingly. For instance, based on network policy for the respective intermediate networks 112, the intermediate network controllers 120 may ascertain whether rerouting to different intermediate networks 112 is preferred and/or permitted.

Thus, the scenario 300 illustrates that routing awareness may be generated on a network-by-network basis to identify preferred path candidates, and that routing paths for communication sessions may be preemptively and/or dynamically configured and reconfigured based on the routing awareness to include protocol-supportive networks.

Figure 4:
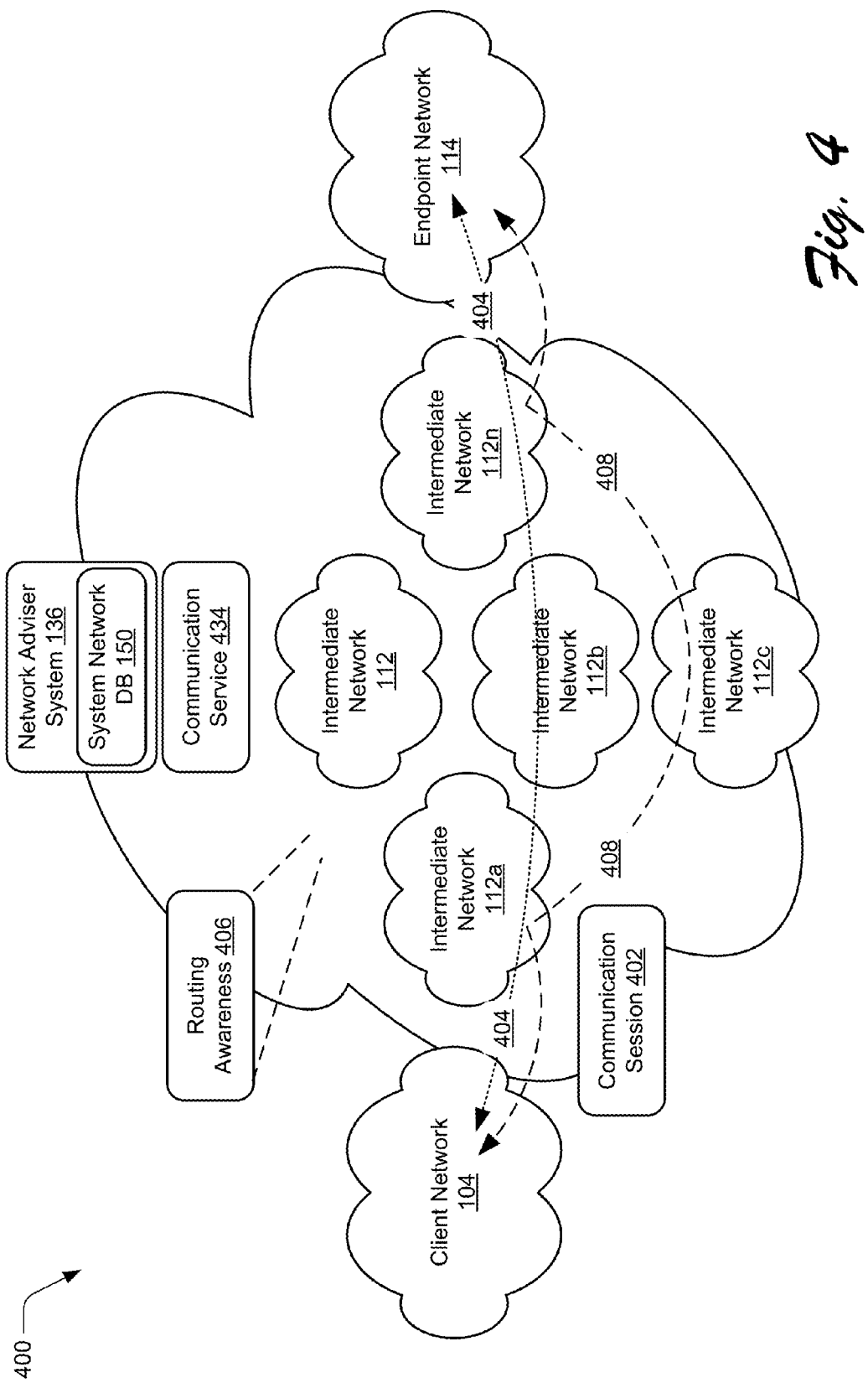
FIG. 4 illustrates an example implementation scenario for rerouting a communication session in accordance with one or more embodiments.

FIG. 4 illustrates an example implementation scenario 400 for rerouting a communication session in accordance with one or more implementations. The scenario 400 includes various entities and components introduced above with reference to the environment 100. To simplify understanding, certain elements of the environment 100 are visually omitted, but are considered for purpose of discussion to be present by implication. In at least some implementations, the scenario 400 represents an implementation and/or extension of the scenarios 200, 300.

In the scenario 400, a communication session 402 is initiated or scheduled to be initiated between the client device 102 and the endpoint 116. The communication session 402, for instance, represents an implementation of the communication sessions 202, 302. Accordingly, an initial routing path 404 is determined for the communication session 402, such as based on a shortest path protocol, e.g., BGP. As illustrated, the routing path 404 includes an intermediate network 112a, an intermediate network 112b, and an intermediate network 112n.

Further to the scenario 400, routing awareness 406 is generated for the communication session 402. The routing awareness 406 may be generated in various ways, examples of which are discussed above and below. For instance, the routing awareness 406 may be generated based on routing awareness propagated from the network adviser system 136, such as discussed with reference to the scenario 200. Alternatively or additionally, the routing awareness 406 may be generated via procedures performed by individual networks, such as discussed with reference to the scenario 300.

According to various implementations, the routing awareness 406 identifies preferred path candidates for routing the communication session 402. The routing awareness 406, for instance, specifies that an intermediate network 112c is preferred over the intermediate network 112b. For example, the intermediate network 112c may be identified as a protocol-supportive network, whereas the intermediate network 112b may be identified as a non-protocol supportive or uncharacterized network.

Accordingly, and based on the routing awareness 406, the initial routing path 404 is reconfigured to generate a modified routing path 408. The modified routing path 408 routes the communication session 402 through the intermediate network 112c and not through the intermediate network 112b. According to various implementations, the modified routing path 408 may be a longer routing path than the routing path 404 based on a strict shortest path determination between the client network 104 and the endpoint network 114. This is not intended to be limiting, however, and in other example implementations the modified routing path 408 may be of equal or lesser routing distance than the routing path 404.

According to one or more implementations, the modified routing path 408 may be implemented preemptively prior to initiation of the communication session 402. Alternatively or additionally, the modified routing path 408 may be applied dynamically after initiation of the communication session 402 and while the communication session 402 is in progress. For instance, the modified routing path 408 may be applied to dynamically reroute the communication session 402 from the routing path 404 to the modified routing path 408.

In at least some implementations, the various notifications, queries, and responses discussed in the scenarios above may be configured using the example notification events discussed above, such as via the communication API detailed above. For instance, values for the various attributes discussed with reference to the communication API can be used to propagate the various information discussed with reference to the scenarios 200-400. Thus, the communication API may be leveraged to propagate routing awareness among different entities involved in communication sessions.

As illustrated in the scenarios, routing awareness is propagated out-of-band from communication sessions, e.g., using data streams that are independent of communication sessions. For instance, the various notifications and responses represent instances of routing awareness that may be propagated among entities involved in communication sessions.

While the scenarios are discussed with reference to a communication session between the client device 102 and the endpoint 116, it is to be appreciated that the techniques discussed herein may be employed to propagate routing awareness for multiple communication sessions, e.g., multiple concurrent communication sessions. For instance, the various queries, responses, and notifications may be employed to determine and propagate routing awareness for multiple concurrent communication sessions, such as part of a conference call that involves the client device 102, the endpoint 116, and other endpoints not expressly illustrated. As another example, the communication sessions may be part of a multicast communication event from the client device 102 to multiple other endpoints including the endpoint 116. Thus, routing awareness may be propagated along multiple different routing paths and for individual communication sessions that are concurrently occurring or scheduled to be implemented concurrently.

In at least some implementations, the scenarios discussed above may be performed in response to detecting that a communication session is scheduled to be initiated, e.g., prior to the communication session being initiated. A calendar event, for instance, may indicate that a communication session is scheduled to be initiated at a scheduled future date and time. Accordingly, routing awareness for the scheduled communication session may be generated and propagated prior to initiation of the communication session.

Thus, the scenarios may be performed to propagate routing awareness of a communication session prior to the schedule date and time. Such proactive routing awareness may be employed for various purposes, such as enable individual networks to set aside resources to handle the scheduled communication sessions.

In at least some implementations, the scenarios may be performed while a communication session is in progress, such as multiple times during a communication session. For instance, the scenarios may be performed periodically during a communication session to maintain active state awareness of network and communication session conditions. Alternatively or additionally, the scenarios may be performed in response to a trigger event, such as an indication of session problems and/or of network problems within a particular network. Thus, routing awareness propagated according to the scenarios discussed above may be leveraged for various purposes, such as for session initiation, session diagnostics and repair, session termination, post-session analytics, and so forth.

Accordingly, routing awareness of conditions pertaining to networks and communication sessions can be shared among entities involved in routing and/or handling the communication sessions. Such routing awareness can be leveraged in various ways, such as for optimizing performance of the communication sessions, mitigating errors that occur and/or may occur in the communication sessions, and so forth.

Having discussed some example implementation scenarios, consider now a discussion of some example procedures in accordance with one or more embodiments.

Example Procedures

The following discussion describes some example procedures for propagating routing awareness for autonomous networks in accordance with one or more embodiments. The example procedures may be employed in the environment 100 of FIG. 1, the system 800 of FIG. 8, and/or any other suitable environment. The procedures, for instance, represent example procedures for implementing the implementation scenarios described above. In at least some embodiments, the steps described for the various procedures can be implemented automatically and independent of user interaction.

Figure 5:
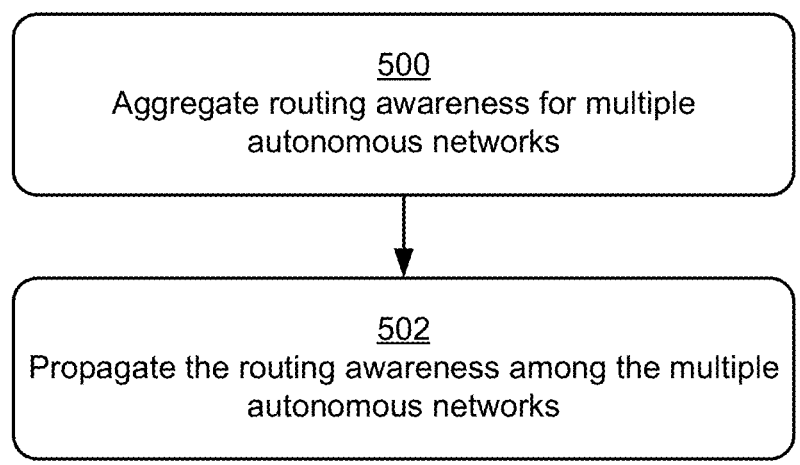
FIG. 5 is a flow diagram that describes steps in a method for propagating routing awareness in accordance with one or more embodiments.

FIG. 5 is a flow diagram that describes steps in a method in accordance with one or more implementations. The method describes an example procedure for propagating routing awareness in accordance with one or more implementations.

Step 500 aggregates routing awareness for multiple autonomous networks. Example ways of aggregating routing awareness are discussed above, such as with reference to the scenarios 200-400. For instance, routing awareness can be received and aggregated by a system that is implemented separately from individual autonomous networks, such as the network adviser system 136. For example, the network adviser system 136 can receive routing path attributes from the individual autonomous networks, and can aggregate the routing path attributes to generate routing awareness. Alternatively or additionally, routing awareness can be aggregated based on communication of routing path attributes between different networks, e.g., between different network advisers.

Generally, routing awareness includes various types of information that pertains to routing paths for a communication session. Routing awareness, for instance, indicates whether particular networks are protocol supportive or non-supportive networks. Other example attributes that may be included in routing awareness are detailed above with reference to the notification events and/or the communication API. Routing awareness, for instance, specifies performance attributes of autonomous networks through which a communication session may be routed.

In at least some implementations, routing path awareness can be aggregated in response to an indication that a communication session is initiated or scheduled to be initiated. With reference to the environment 100, for example, one or more of the network advisers receives an indication of a communication session that involves one or more of the networks. The indication can be received in various ways, such as via a notification from a communication client (e.g., the communication client 130), from a network controller, from the network adviser system 136, and so forth.

In at least some implementations, a scheduled communication session can be detected, such as based on a calendar event that includes a scheduled communication session. For instance, a user can leverage a calendar application to schedule a calendar event for a future date and time, such as a web meeting, a conference call, a multicast session, and so forth. The user can specify parameters for the calendar event, such as a date and time, users to be invited, types of communication media involved, and so forth. Thus, ascertaining that a communication session is scheduled to be initiated can be based on detecting a calendar event that includes the communication session.

Step 502 propagates the routing awareness among the multiple autonomous networks. The routing awareness, for instance, is communicated out-of-band from a data stream of a communication session.

In at least some implementations, the routing awareness is communicated between the autonomous networks themselves, such as via network-to-network communications. For instance, network advisers for the different autonomous networks can engage in direct communication with one another to exchange routing awareness.

Alternatively or additionally, routing awareness can be propagated by a service and/or system that is implemented separately from the autonomous networks, such as the network adviser system 136.

As discussed above, routing awareness can be implemented in different ways. For instance, routing awareness may include instructions to route a communication session through a particular preferred network. Alternatively or additionally, routing awareness may identify particular preferred network for routing a communication session, and enable a network-related entity (e.g., a network controller) to decide whether to route the communication session to the preferred network. Thus, according to various implementations, routing awareness may be prescriptive or informative.

Figure 6:
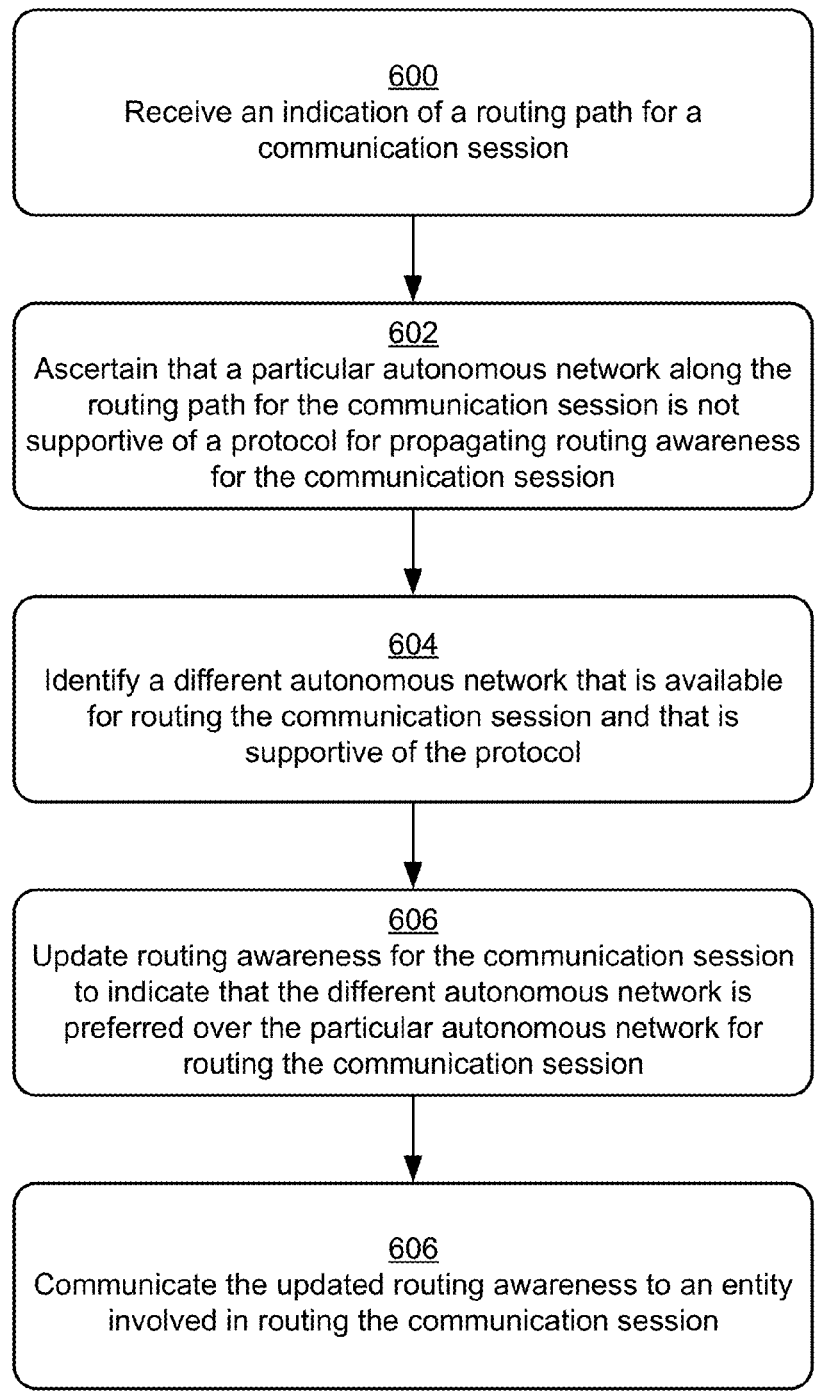
FIG. 6 is a flow diagram that describes steps in a method for indicating a routing path preference in accordance with one or more embodiments.

FIG. 6 is a flow diagram that describes steps in a method in accordance with one or more embodiments. The method describes an example procedure for indicating a routing path preference in accordance with one or more embodiments.

Step 600 receives an indication of a routing path for a communication session. The indication, for instance, corresponds to an indication that a communication session between two endpoints is initiated or scheduled to be initiated. For example, a network adviser for a particular autonomous network receives a notification that a communication session is initiated, such as from a communication client. In at least some implementations, the indication of the routing path can identify networks along a routing path for a communication session, such as via identifiers for networks and/or network components of the routing path. According to various implementations, the communication session may correspond to a hypothetical communication session between two endpoints and need not necessarily be an actual communication session.

Step 602 ascertains that a particular autonomous network along the routing path for the communication session is not supportive of a protocol for propagating routing awareness for the communication session. The particular autonomous network, for instance, may be determined based on a routing path calculated using a shortest path algorithm. Example ways of determining whether a network is a supportive network are discussed above.

Step 604 identifies a different autonomous network that is available for routing the communication session and that is supportive of the protocol. A client network adviser for the particular network, for instance, queries a network controller and/or a routing table of the particular network for another network that is available for routing the communication session.

Step 606 updates routing awareness for the communication session to indicate that the different autonomous network is preferred over the particular autonomous network for routing the communication session. The routing awareness, for instance, may include a modified routing path for the communication session that replaces the particular network with the different network.

Step 608 communicates the updated routing awareness to an entity involved in routing the communication session. For instance, the updated routing awareness can be communicated to a network controller for the particular autonomous network to enable a routing path to be reconfigured to include the different autonomous network and/or exclude the particular autonomous network. Alternatively or additionally, the updated routing awareness can be communicated to an external service (e.g., the network adviser system 136) such that the updated routing awareness can be aggregated and propagated to other entities involved in routing communication sessions.

As discussed above, updated routing awareness can be propagated as instructions to reroute a communication session, and/or as information that may be implemented at the discretion of other entities (e.g., network controllers) involved in routing communication sessions.

Figure 7:
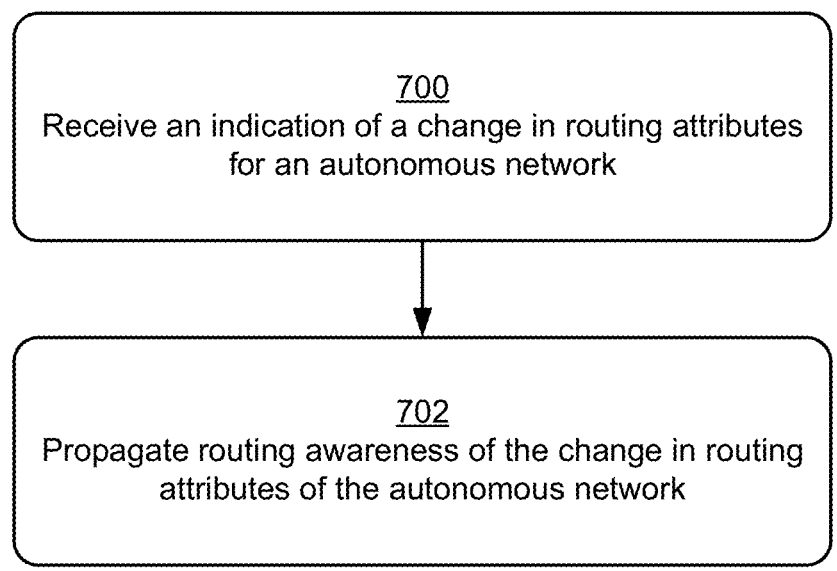
FIG. 7 is a flow diagram that describes steps in a method for propagating routing awareness of a change in routing path attributes in accordance with one or more embodiments.

FIG. 7 is a flow diagram that describes steps in a method in accordance with one or more embodiments. The method describes an example procedure for propagating routing awareness of a change in routing path attributes in accordance with one or more embodiments.

Step 700 receives an indication of a change in routing attributes for an autonomous network. For instance, an indication that the autonomous network supports the routing awareness protocol discussed herein may be received. The autonomous network, for instance, may not have previously supported the routing awareness protocol, but may be reconfigured to support the routing awareness protocol.

Other examples of routing attributes that may change are discussed above with reference to the example notification events and the example communication API. The change in routing attributes, for instance, may be based on an indication of a decrease in session quality and/or an increase in session errors that occur in communication sessions across the autonomous network. Examples of such indicia include an increase in jitter, packet loss rate, packet error rate, and so forth. In at least some implementations, the change in routing attributes may be indicated based on user input specifying that the quality of the communication session has decreased.

The change in routing path attributes may be based on changes in network conditions within an autonomous network, such as an increase in network congestion, a failure of one or more network components, a decrease in available bandwidth, and so forth.

According to various implementations, the indication of the change may be received by an entity associated with an autonomous network, such as a network adviser for the autonomous network. Additionally or alternatively, the indication of the change may be received by another entity, such as a network adviser for a different autonomous network, the network adviser system 136, and so forth.

According to various implementations, the indication of the change is received while a communication session is in progress. The autonomous network, for instance, occurs within a group of autonomous networks that make up a total routing path for a communication session.

Step 702 propagates routing awareness of the change in routing attributes of the autonomous network. For instance, a network adviser for the autonomous network propagates the routing awareness of the change to other entities, such as other network advisers for other autonomous networks, the network adviser system 136, and so forth. In at least some implementations, the network adviser system 136 can propagate the routing awareness of the change to one or more network advisers for other autonomous networks.

In at least some implementations, routing awareness of a change in routing path attributes can enable a routing path of a communication session to be reconfigured. For instance, if the change indicates errors and/or problems in the communication session across the autonomous network, the routing path can be recalculated around the autonomous network.

For instance, a network adviser that detects the change in routing path attributes can notify a respective network controller, which can recalculate the routing path around the autonomous network. The routing path, for example, can be recalculated to include a different autonomous network such that the problematic autonomous network is avoided.

Alternatively, if the change indicates that the autonomous network is supportive of the routing awareness protocol and/or that performance attributes of the autonomous network indicate an increase in session quality, a routing path for a communication session can be recalculated to include the autonomous network. For instance, the routing path can be recalculated to include the autonomous network in place of a current autonomous network that does not support the routing awareness protocol and/or that is experiencing session problems.

According to various implementations, the methods described above may be performed multiple times at various stages of a communication session, such as prior to session initiation, concurrent with session initiation, during a communication session, at session termination, and post communication session. For instance, routing awareness can be propagated and updated in real-time while a communication session is in progress to maintain dynamic and active state awareness of routing conditions that may affect the communication session.

Routing awareness may also be proactively communicated prior to initiation of a communication session, such as to enlighten autonomous networks of routing conditions in different autonomous networks and enable the autonomous networks to make enlightened decisions regarding routing of communication sessions. Routing awareness may be communicated after termination of a communication session, such as for system diagnostics and statistical analysis of network performance that occurred during the communication session.

Thus, techniques discussed herein provide a wide variety of scenarios and implementations for propagating routing awareness to different entities involved in routing communication sessions. Routing awareness enables such entities to make informed decisions regarding routing and handling of communication session data.

Having discussed some example procedures, consider now a discussion of an example system and device in accordance with one or more embodiments.

Example System and Device

Figure 8:
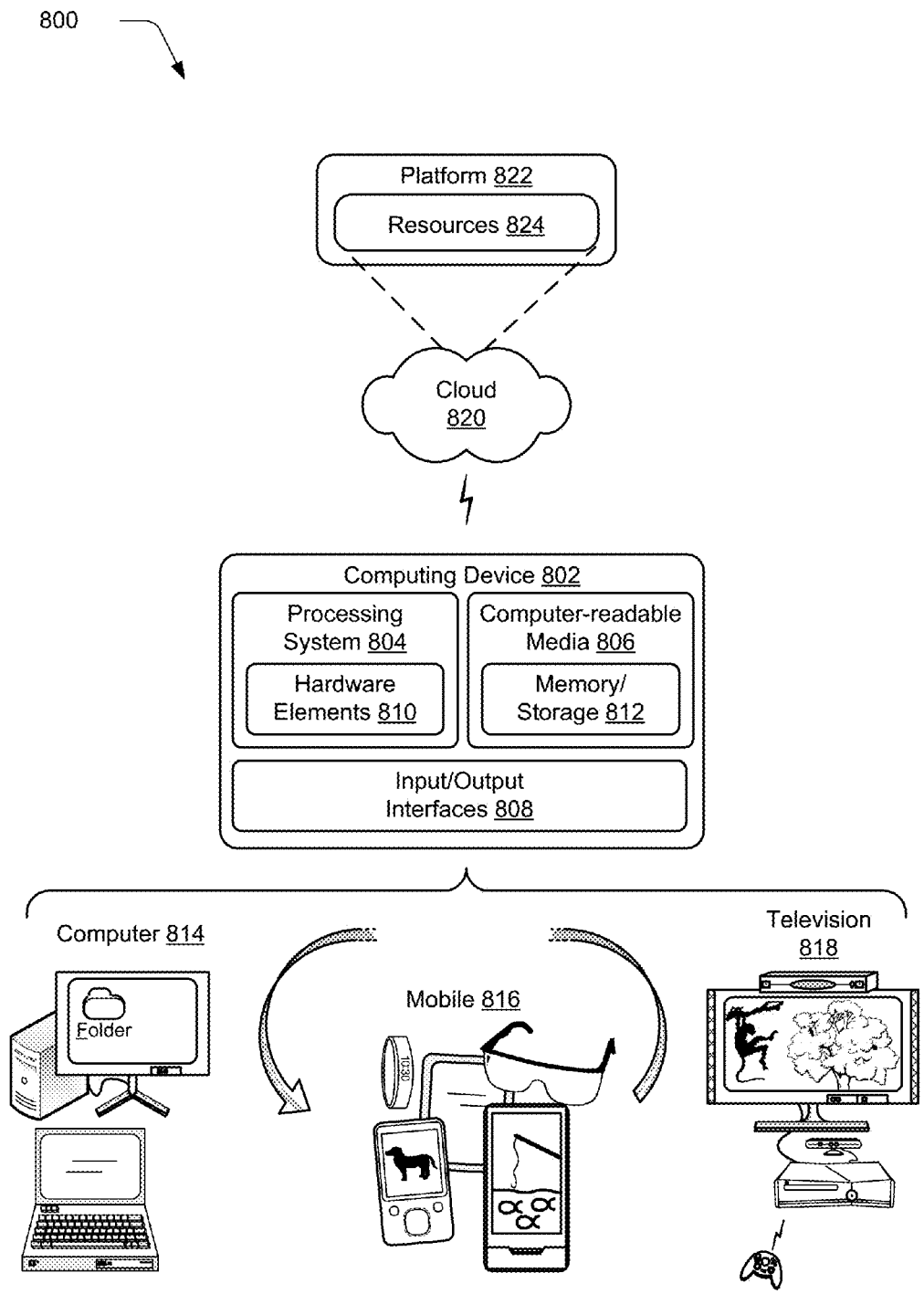
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the client device 102 and/or the endpoint 116 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the network advisers, the communication service 134, and/or the network adviser system 136 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for propagating routing awareness for autonomous networks are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   aggregating routing awareness for multiple autonomous networks, the routing awareness specifying whether individual networks of the multiple autonomous networks support a routing awareness protocol for propagating routing awareness for routing of a communication session, the routing awareness protocol identified via a custom protocol identifier (ID) and indicating one or more procedures for propagating attributes of the individual network and the communication session; and
   propagating the routing awareness to one or more of the multiple autonomous networks independently of a data stream of the communication session.

2. A method as described in claim 1, wherein said aggregating occurs in response to initiation of the communication session.

3. A method as described in claim 1, wherein said aggregating occurs in response to ascertaining that the communication session is scheduled to occur at a future time.

4. A method as described in claim 1, further comprising, prior to said aggregating:
   receiving routing path attributes from one or more of the autonomous networks; and
   aggregating the routing awareness to include the routing path attributes.

5. A method as described in claim 1, wherein the routing awareness indicates that a particular autonomous network that supports the routing awareness protocol for propagating routing awareness is preferred for routing the communication session over a different autonomous network that is not supportive of the routing awareness protocol.

6. A method as described in claim 1, wherein the routing awareness comprises performance attributes of at least one of the autonomous networks.

7. A method as described in claim 1, wherein the routing awareness indicates that at least one of the autonomous networks is listed on one of a whitelist, a blacklist, or a greylist of networks for routing communication sessions.

8. A method as described in claim 1, further comprising:
   receiving an indication of a change in routing attributes for a particular autonomous network of the multiple autonomous networks; and
   propagating further routing awareness of the change in routing attributes of the particular autonomous network.

9. A system comprising:
   at least one processor; and
   one or more computer-readable storage media including instructions stored thereon that, responsive to execution by the at least one processor, cause the system perform operations including:
      receiving an indication of a routing path for a communication session;
      ascertaining that a particular autonomous network along the routing path for the communication session is not supportive of a routing awareness protocol for propagating routing awareness for the communication session, the routing awareness protocol identified via a custom protocol identifier (ID) and indicating one or more procedures for propagating attributes of the individual networks and the communication session;
      identifying a different autonomous network that is available for routing the communication session and that is supportive of the routing awareness protocol; and
      updating routing awareness for the communication session to indicate that the different autonomous network is preferred over the particular autonomous network for routing the communication session.

10. A system as recited in claim 9, wherein the system comprises a network system that is implemented separately from the particular autonomous network and the different autonomous network.

11. A system as recited in claim 9, wherein the system is implemented by another autonomous network separate from the particular autonomous network and the different autonomous network.

12. A system as recited in claim 9, wherein the indication of the routing path comprises an indication that the communication session is scheduled to occur.

13. A system as recited in claim 9, wherein the indication of the routing path comprises an indication that the communication session is in progress.

14. A system as recited in claim 9, wherein the routing awareness includes routing path attributes for multiple autonomous networks along the routing path for the communication session.

15. A system as recited in claim 9, further comprising communicating the updated routing awareness to an entity involved in routing the communication session.

16. A computer-implemented method, comprising:
   aggregating, in response to initiation of a communication session, routing awareness for one or more autonomous networks along a routing path of the communication session, the routing awareness specifying whether the one or more autonomous networks support a routing awareness protocol for propagating routing awareness for routing of the communication session, the routing awareness protocol identified via a custom protocol identifier (ID) and indicating one or more procedures for propagating attributes of the individual networks and the communication session; and propagating the routing awareness to at least one other autonomous network along the routing path of the communication session independently from a data stream of the communication session.

17. A method as described in claim 16, wherein the routing awareness indicates that at least one of the one or more autonomous networks is a preferred network for routing the communication session.

18. A method as described in claim 16, wherein the routing awareness includes performance attributes for the one or more of the autonomous networks.

19. A method as described in claim 16, wherein the routing awareness includes an instruction or a suggestion to modify the routing path to replace a particular autonomous network with a different autonomous network.

20. A method as described in claim 16, further comprising:

receiving an indication of a change in routing attributes for a particular autonomous network of the one or more autonomous networks; and propagating further routing awareness of the change in routing attributes of the particular autonomous network.

\* \* \* \* \*